(12) United States Patent
Levien et al.

(10) Patent No.: US 8,990,400 B2
(45) Date of Patent: Mar. 24, 2015

(54) FACILITATING COMMUNICATIONS AMONG MESSAGE RECIPIENTS

(75) Inventors: Royce A. Levien, Lexington, MA (US); Robert W. Lord, Seattle, WA (US); Mark A. Malamud, Seattle, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1139 days.

(21) Appl. No.: 11/894,053

(22) Filed: Aug. 17, 2007

(65) Prior Publication Data

US 2009/0049502 A1    Feb. 19, 2009

(51) Int. Cl.
*G06F 15/16* (2006.01)
*G06Q 10/10* (2012.01)
*H04N 21/422* (2011.01)
*H04N 21/432* (2011.01)
*H04N 21/4788* (2011.01)

(52) U.S. Cl.
CPC ......... *G06Q 10/10* (2013.01); *H04N 21/42202* (2013.01); *H04N 21/4325* (2013.01); *H04N 21/4788* (2013.01)
USPC ........................... 709/227; 709/203; 709/248

(58) Field of Classification Search
CPC ........ G06Q 10/10; G06Q 50/26; H04L 51/04; H04L 63/12; G06F 17/30017; G06F 17/3074
USPC .......................................... 709/203, 227, 248
See application file for complete search history.

(56) References Cited

U.S. PATENT DOCUMENTS

| | | | |
|---|---|---|---|
| 5,812,394 A | 9/1998 | Lewis et al. | |
| 5,915,973 A | 6/1999 | Hoehn-Saric et al. | |
| 5,973,685 A | 10/1999 | Schaffa et al. | |
| 6,000,942 A | 12/1999 | Hogue et al. | |
| 6,137,884 A | 10/2000 | Micali | |
| 6,297,852 B1 * | 10/2001 | Laksono et al. | 348/584 |
| 6,381,556 B1 | 4/2002 | Kazemi et al. | |
| 6,386,882 B1 | 5/2002 | Linberg | |
| 6,393,490 B1 | 5/2002 | Stiles et al. | |
| 6,426,778 B1 | 7/2002 | Valdez, Jr. | |
| 6,564,154 B1 | 5/2003 | Zimmerman et al. | |
| 6,685,476 B1 | 2/2004 | Safran, Sr. | |
| 6,781,978 B1 * | 8/2004 | Xie et al. | 370/338 |
| 6,916,180 B1 | 7/2005 | Price et al. | |
| 6,947,388 B1 * | 9/2005 | Wagner | 370/252 |
| 6,961,482 B2 | 11/2005 | Knowles | |
| 7,100,188 B2 * | 8/2006 | Hejna, Jr. | 725/100 |
| 7,150,630 B2 | 12/2006 | Budra et al. | |
| 7,162,431 B2 | 1/2007 | Guerra | |
| 7,198,490 B1 | 4/2007 | Olsen | |
| 7,287,054 B2 * | 10/2007 | Lee et al. | 709/204 |
| 7,310,676 B2 * | 12/2007 | Bourne | 709/227 |
| 7,436,292 B2 | 10/2008 | Rourke et al. | |
| 7,571,250 B2 * | 8/2009 | Ludvig et al. | 709/240 |
| 7,774,461 B2 * | 8/2010 | Tanaka et al. | 709/224 |
| 8,620,365 B2 * | 12/2013 | Hunziker | 455/466 |
| 8,745,143 B2 * | 6/2014 | Vitaldevara et al. | 709/206 |
| 8,787,737 B2 * | 7/2014 | Wald et al. | 386/347 |
| 8,825,809 B2 * | 9/2014 | Soldan et al. | 709/219 |

(Continued)

*Primary Examiner* — Anthony Mejia

(57) ABSTRACT

A system, method, computer program product, and carrier are described for obtaining an indication of a first device receiving a message portion during a time interval in which a second device received the message portion and signaling a decision whether to facilitate a signal transfer at least between the first device and the second device.

28 Claims, 21 Drawing Sheets

(56) References Cited

U.S. PATENT DOCUMENTS

| | | |
|---|---|---|
| 2002/0064766 A1 | 5/2002 | Cozens et al. |
| 2003/0093810 A1* | 5/2003 | Taniguchi ............... 725/112 |
| 2003/0124502 A1 | 7/2003 | Chou |
| 2003/0131352 A1 | 7/2003 | Dutta et al. |
| 2004/0029092 A1 | 2/2004 | Orr et al. |
| 2004/0060075 A1 | 3/2004 | Adolph et al. |
| 2005/0125353 A1 | 6/2005 | Schlesinger et al. |
| 2005/0216948 A1* | 9/2005 | MacInnis ............... 725/117 |
| 2005/0255438 A1 | 11/2005 | Manos |
| 2005/0262526 A1 | 11/2005 | Lindenberg |
| 2006/0101499 A1 | 5/2006 | Aravamudan et al. |
| 2006/0125962 A1* | 6/2006 | Shelton et al. ............. 348/588 |
| 2006/0142913 A1 | 6/2006 | Coffee et al. |
| 2006/0168616 A1 | 7/2006 | Candelore |
| 2006/0218481 A1 | 9/2006 | Adams Jr. et al. |
| 2007/0016319 A1* | 1/2007 | Forster et al. ............. 700/100 |
| 2007/0078820 A1 | 4/2007 | Lana |
| 2007/0099167 A1 | 5/2007 | Eason |
| 2007/0118661 A1* | 5/2007 | Vishwanathan et al. ...... 709/227 |
| 2007/0180388 A1 | 8/2007 | Izhikevich |
| 2008/0222295 A1* | 9/2008 | Robinson et al. ............. 709/227 |
| 2008/0267134 A1* | 10/2008 | Cheng et al. ............. 370/335 |

* cited by examiner

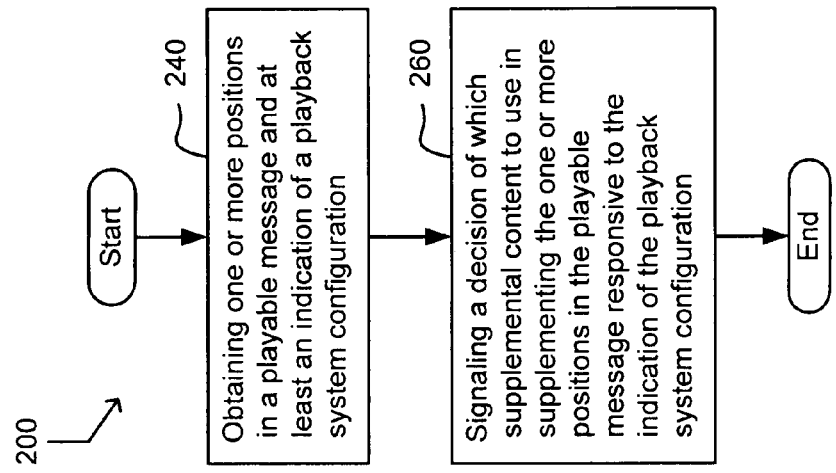
FIG. 2
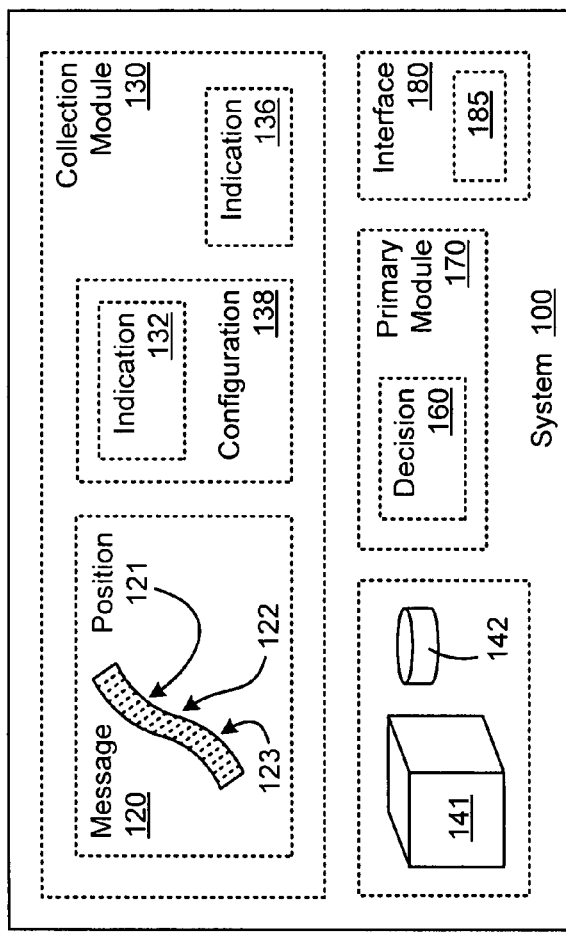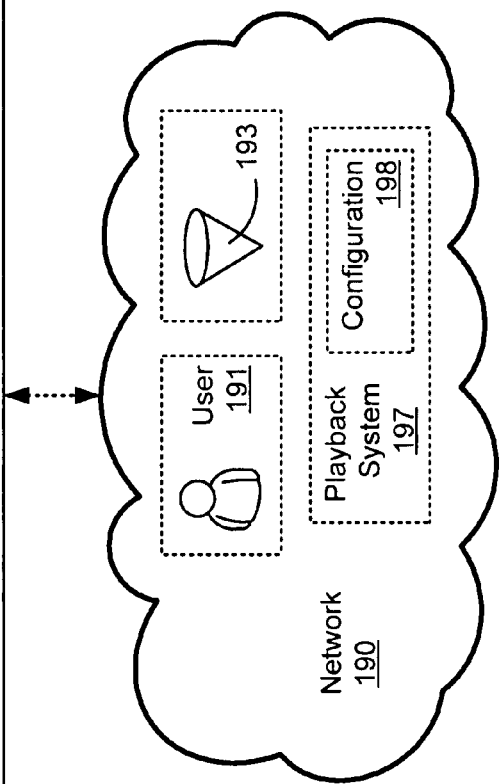
FIG. 1

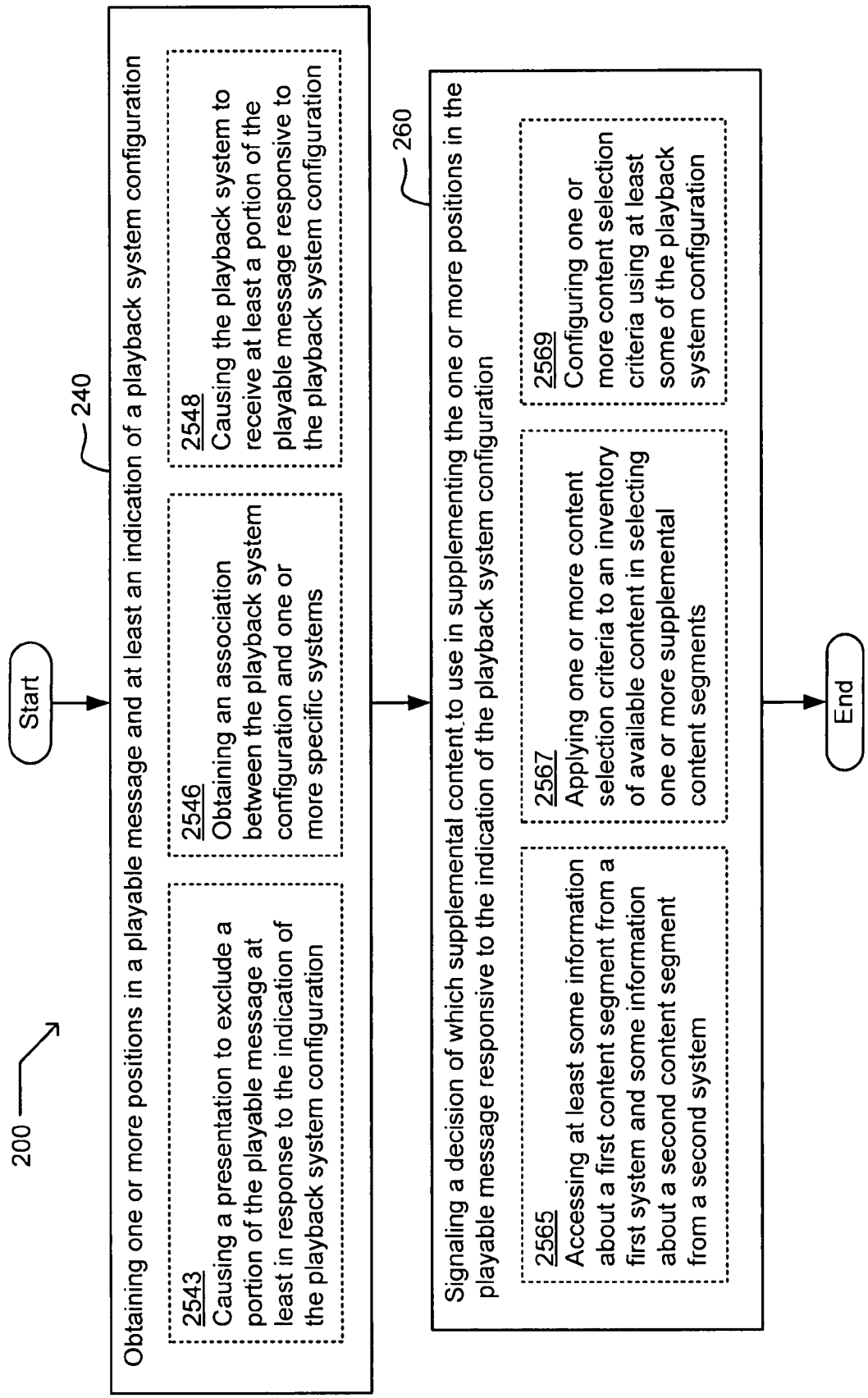

FACILITATING COMMUNICATIONS AMONG MESSAGE RECIPIENTS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/893,994, entitled SELECTIVE INVOCATION OF PLAYBACK CONTENT SUPPLEMENTATION, naming Royce A. Levien, Robert W. Lord, Mark A. Malamud, and Lowell L. Wood, Jr. as inventors, filed 17 Aug. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/894,028, entitled EFFECTIVELY DOCUMENTING IRREGULARITIES IN A RESPONSIVE USER'S ENVIRONMENT, naming Royce A. Levien, Robert W. Lord, Mark A. Malamud, and Lowell L. Wood, Jr. as inventors, filed 17 Aug. 2007, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

In one aspect, a method includes but is not limited to obtaining one or more positions in a playable message and at least an indication of a playback system configuration and signaling a decision of which supplemental content to use in supplementing the one or more positions in the playable message. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining one or more positions in a playable message and at least an indication of a playback system configuration and circuitry for signaling a decision of which supplemental content to use in supplementing the one or more positions in the playable message. In addition to the foregoing, other system aspects are described in the claims, drawings, and text forming a part of the present disclosure.

In addition to the foregoing, various other method and/or system and/or program product and/or physical carrier aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

In one aspect, a method includes but is not limited to obtaining an indication of a first device receiving a message portion during a time interval in which a second device received the message portion and signaling a decision whether to facilitate a signal transfer at least between the first device and the second device. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining an indication of a first device receiving a message portion during a time interval in which a second device received the message portion and circuitry for signaling a decision whether to facilitate a signal transfer at least between the first device and the second device. In addition to the foregoing, other system aspects are described in the claims, drawings, and text forming a part of the present disclosure.

In addition to the foregoing, various other method and/or system and/or program product and/or physical carrier aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

In one aspect, a method includes but is not limited to accepting user-response-indicative data and environmental-regularity-indicative data from an environment and configuring a distillation recording of the environmental-regularity-indicative data and a distillation recording of the user-response-indicative data. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for accepting user-response-indicative data and environmental-regularity-indicative data from an environment and circuitry for configuring a distillation recording of the environmental-regularity-indicative data and a distillation recording of the user-response-indicative data. In addition to the foregoing, other system aspects are described in the claims, drawings, and text forming a part of the present disclosure.

In addition to the foregoing, various other method and/or system and/or program product and/or physical carrier aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 1 depicts an exemplary environment in which one or more technologies may be implemented.

FIG. 2 depicts a high-level logic flow of an operational process.

FIGS. 24-25 depict variants of the flow of FIG. 2.

DETAILED DESCRIPTION

Figure 4:
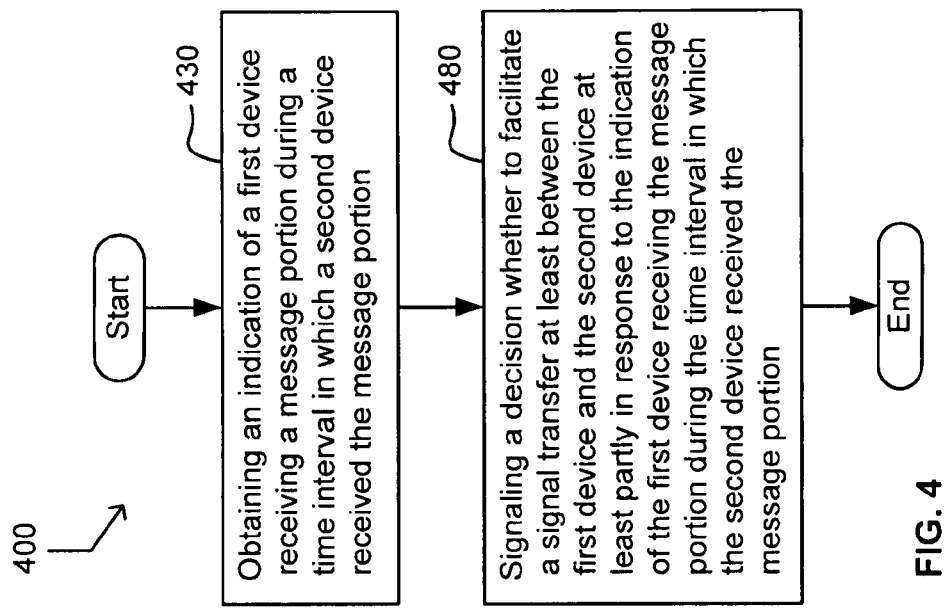
FIG. 4 depicts a high-level logic flow of an operational process.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In the following detailed description, reference is made to the accompanying drawings, which form a part hereof. The use of the same symbols in different drawings typically indicates similar or identical items. The illustrative embodiments described in the detailed description, drawings, and claims are not meant to be limiting. Other embodiments may be utilized, and other changes may be made, without departing from the spirit or scope of the subject matter presented here.

Following are a series of systems and flowcharts depicting implementations of processes. For ease of understanding, the flowcharts are organized such that the initial flowcharts present implementations via an initial "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

With reference now to FIG. 1, shown is an example of a system that may (optionally) serve as a context for introducing one or more processes and/or devices described herein. As shown system 100 may (optionally) include one or more instances of collection modules 130; content items 141, 142; decisions 160; primary modules 170; or interfaces 180 operable for handling output 185. Collection module 130 may comprise one or more instances of positions 121, 122, 123 in respective messages 120; indications 132, 136; or configurations 138. As shown each such system 100 may be operably (directly or indirectly) coupled with one or more instances of network 190. Network 190 may (optionally) include or access one or more instances of users 191, content items 193, or playback systems 197 (optionally each with one or more configurations 198).

With reference now to FIG. 2, there is shown a high-level logic flow 200 of an operational process. Flow 200 includes operation 240—obtaining one or more positions in a playable message and at least an indication of a playback system configuration (e.g. collection module 130 detecting or otherwise identifying one or more positions 122 in playable message 120 and also at least an indication 132 of a playback system configuration 138). This may occur, for example, in an embodiment in which a local interface 180 comprises the playback system. Alternatively or additionally, collection module 130 may use a local indication 136 of remote information such as a configuration 198 of one or more other playback systems 197.

Flow 200 further includes operation 260—signaling a decision of which supplemental content to use in supplementing the one or more positions in the playable message responsive to the indication of the playback system configuration (e.g. primary module 170 transmitting or implementing a decision 160 on which one or more items 141, 142 of content will be used in supplementing the one or more identified positions 122). This may occur, for example, in embodiments in which the decision 160 is received from a user 191 accessible by a network or in which the decision is received via a local interface 180. Alternatively or additionally, the decision may be manifested by expressing the decision 160 or the supplemented message 120 as output 185. In some variants, for example, such output 185 may be enabled or presented locally and/or via one or more playback systems 197.

Figure 3:
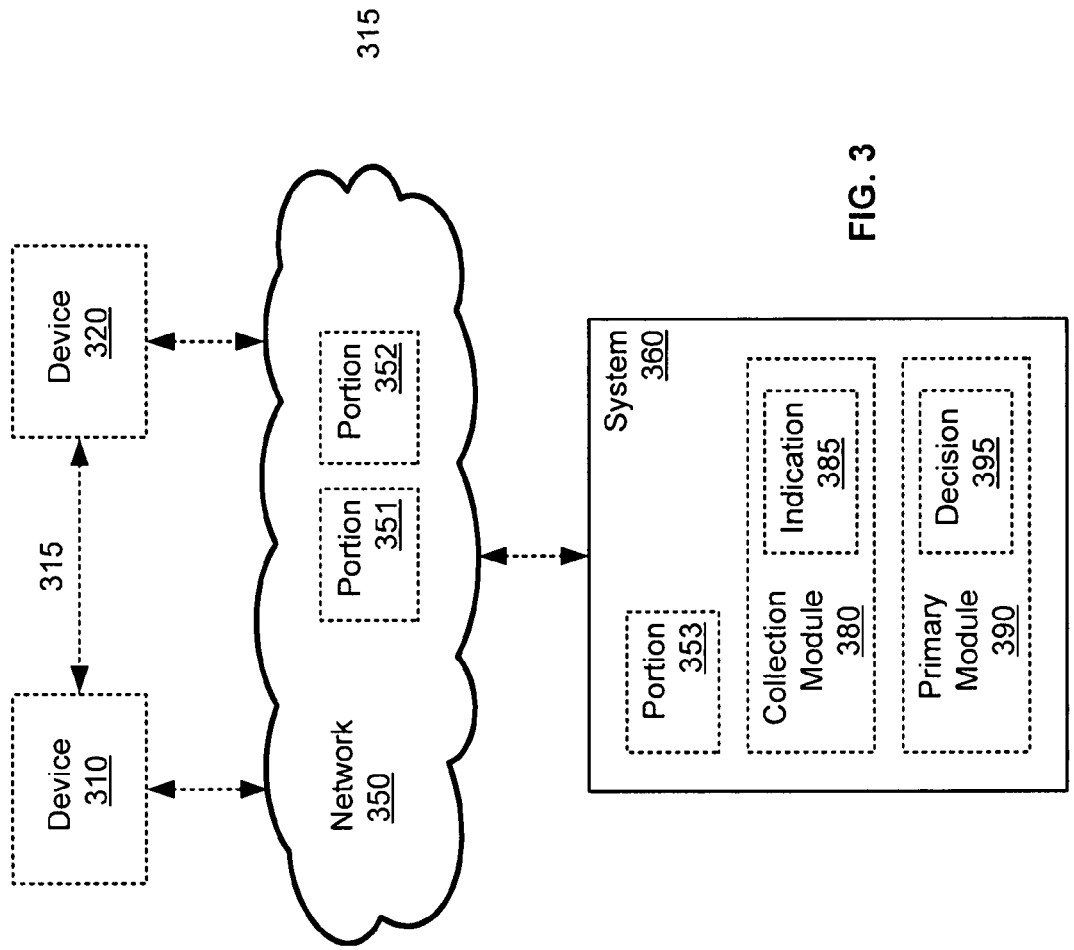
FIG. 3 depicts an exemplary environment in which one or more technologies may be implemented.

With reference now to FIG. 3, shown is another example of a system that may serve as a context for introducing one or more processes and/or devices described herein. As shown devices 310, 320 may be configured to interact with network 350 or with each other, such as potentially through linkage 315. Network 350 may include or access one or more message portions 351, 352, 353 such as by being coupled with system 360. As shown system 360 may include one or more instances of message portions 353; collection modules 380 operable for handling indications 385 as described herein; or primary modules 390 operable for handling decisions 395 as described next.

With reference now to FIG. 4, there is shown a high-level logic flow 400 of an operational process. Flow 400 includes operation 430—obtaining an indication of a first device receiving a message portion during a time interval in which a second device received the message portion (e.g. collection module 380 generating or receiving one or more indications 385 of device 310 receiving at least portion 351 during a retrieval, billing period, performance, or other observable period in which device 320 also received portion 351). Alternatively or additionally, collection module 380 may likewise perform operation 430 by detecting portion 352 being apparently transmitted to device 320 or by detecting portion 351 being apparently received in system 360, roughly corresponding in time to the same one or more portions 351-353 being sent elsewhere. In some variants, moreover, one or more such message portions 351 may be received from local sources, such as in respective vicinities of devices 310, 320.

Flow 400 further includes operation 480—signaling a decision whether to facilitate a signal transfer at least between the first device and the second device at least partly in response to the indication of the first device receiving the message portion during the time interval in which the second device received the message portion (e.g. primary module 390 activating a direct or indirect linkage 315 at least between device 310 and device 320). Alternatively or additionally, primary module 390 may (optionally) manifest an affirmative decision 395 by causing one or both such devices 310, 320 to be notified about the other or in other ways as described herein.

Figure 5:
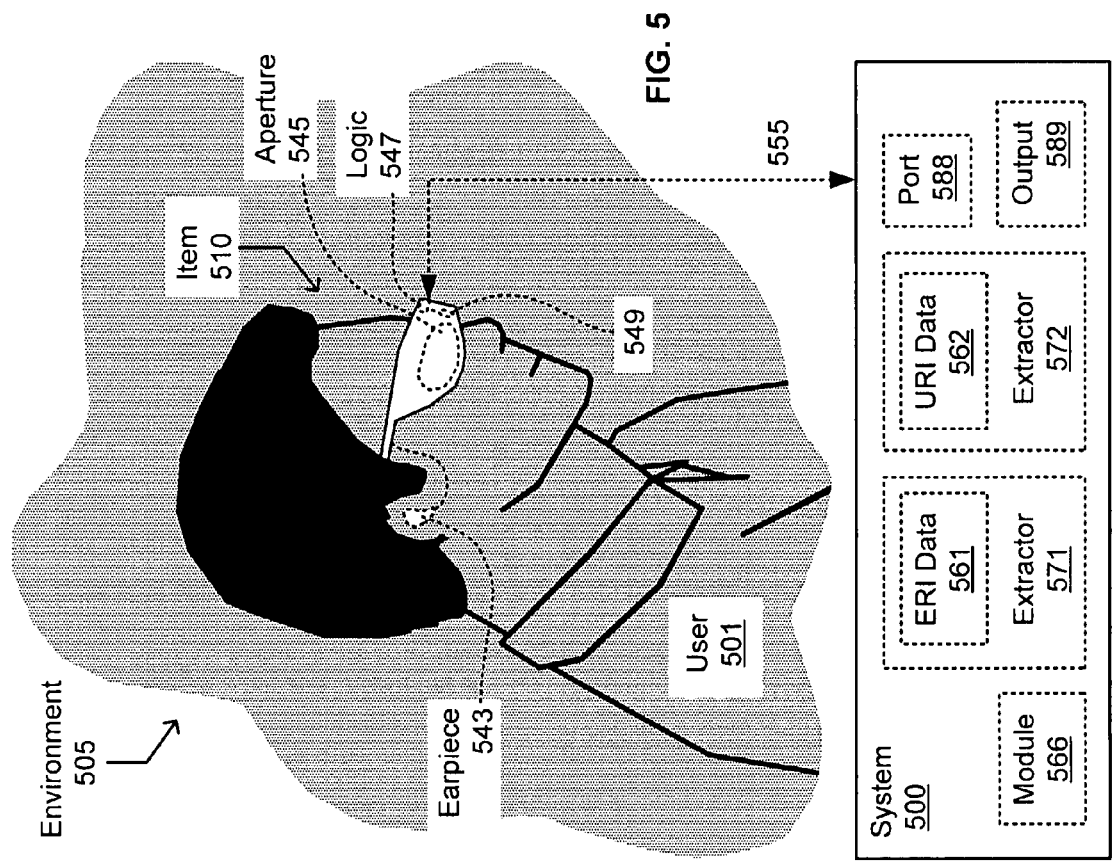
FIG. 5 depicts an exemplary environment in which one or more technologies may be implemented.

With reference now to FIG. 5, shown is another example of a system that may serve as a context for introducing one or more processes and/or devices described herein. Shown there is an academic or medical examinee, survey participant, contestant, voter, or other user 501 whose responses are of interest and who is wearing a sensor apparatus, goggles, or a similar item 510 in environment 505. Item 510 may further comprise one or more instances of earpieces 543, apertures 545, logic 547, or microphones or other sensor modules 549. Item 510 may be configured to fit onto or over eyeglasses, in some embodiments, and/or to have apertures 545 large enough to enable user 501 to read normally. Alternatively or additionally, logic 547 thereof may include one or more instances of processors or other resources as described herein and/or may permit a temporary docking or other intermittent linkage 555 with one or more instances of system 500. System 500 may, in turn, comprise environmental-regularity-indicative (ERI) data 561, user-response-indicative (URI) data 562, modules 566, extractors 571-572, ports 588, or outputs 589 as described below.

Figure 6:
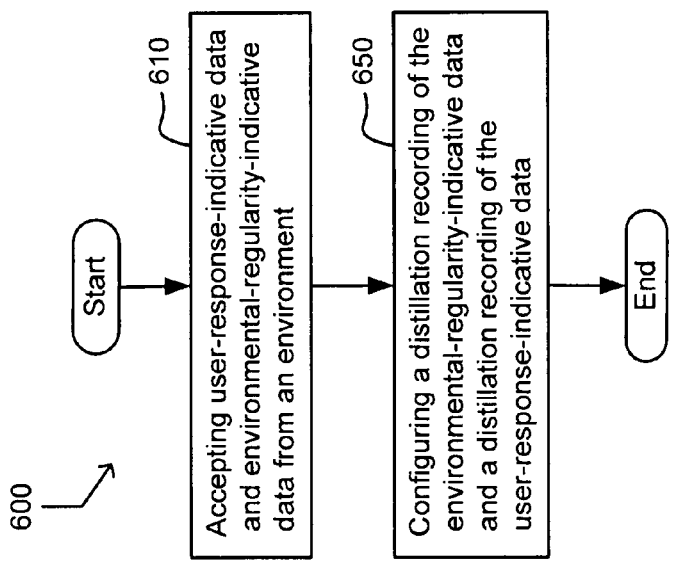
FIG. 6 depicts a high-level logic flow of an operational process.

With reference now to FIG. 6, there is shown a high-level logic flow 600 of an operational process. Flow 600 includes operation 610—accepting user-response-indicative data and environmental-regularity-indicative data from an environment (e.g. logic 547 receiving URI data 562 indicative of one or more users' response to stimuli as well as ERI data 561 indicative of a regularity in their environment 505). This may occur in a virtual environment provided in item 510, for example, in which such data is primarily optical and/or auditory. Alternatively or additionally, sensor module 549 may be configured to detect typed answers received via wireless linkage, particularly in an implementation in which item 510 comprises holes or other optical apertures 545 through which user 501 can see.

Flow 600 further includes operation 650—configuring a distillation recording of the environmental-regularity-indicative data and a distillation recording of the user-response-indicative data (e.g. extractors 571, 572 generating one or more respective components of output 589 or composite output from ERI data 561 and URI data 562). This may occur, for example, in embodiments in which output 589 is recorded locally or in which some or all of it is transmitted to a remote archiving site. Common data may, moreover, comprise more than one such data source and/or be aggregated and/or distilled at various or successive stages as exemplified herein.

Figure 7:
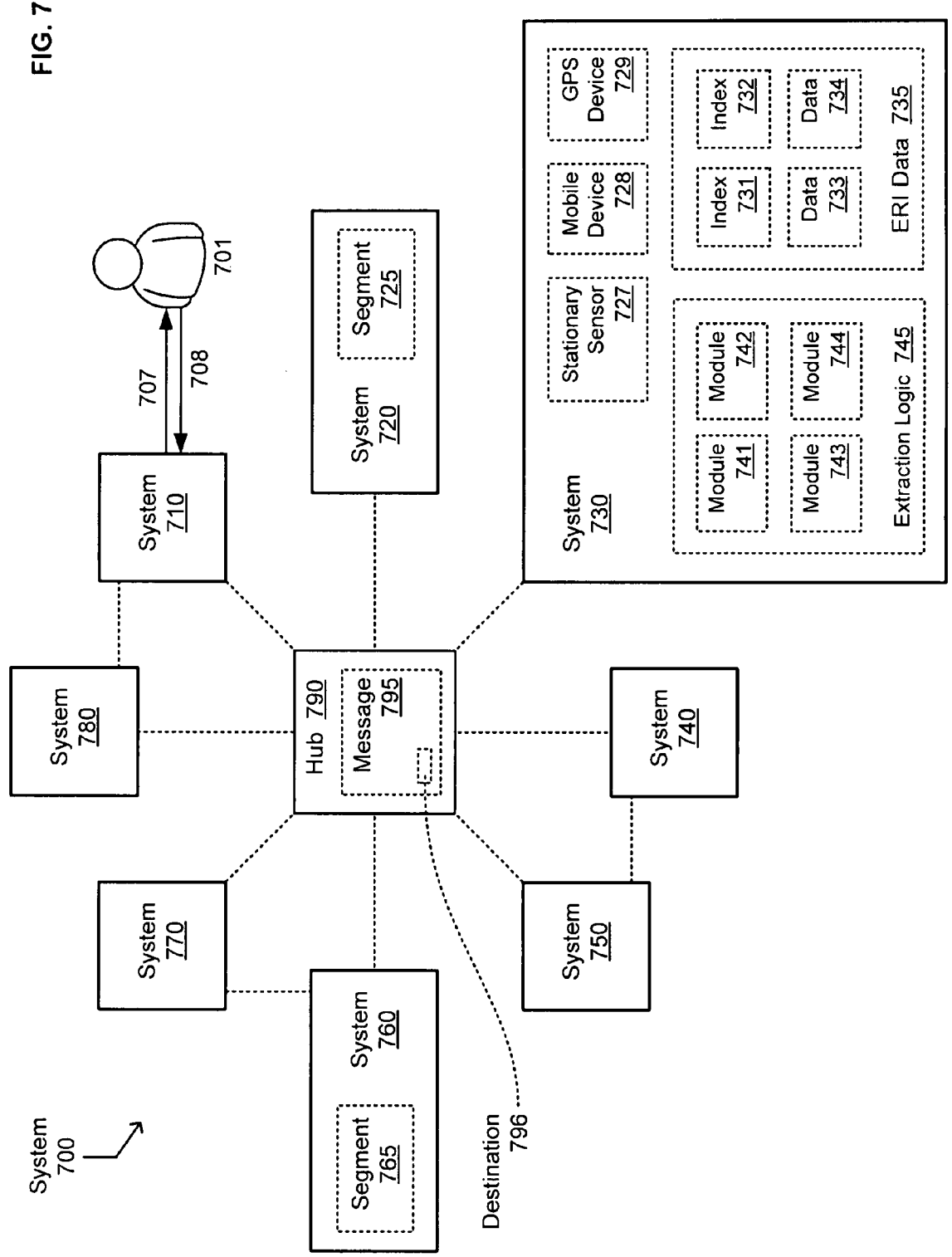
FIGS. 7-19 depict other exemplary environments in each of which one or more technologies may be implemented.

With reference now to FIG. 7, shown is another example of systems that may serve as a context for introducing one or more processes and/or devices described herein. As shown system 700 may (optionally) include one or more instances of systems 710, 720, 730, 740, 750, 760, 770, or 780, each optionally coupled as shown with or through hub 790. Hub 790 may contain or otherwise bear one or more messages 795, optionally expressing respective destinations 796. In a session online, one or more users 701 may each receive output 707 from or provide input 708 to a respective system 710. System 720 may, for example, include one or more instances of segments 725 as described below. System 730 may similarly comprise one or more instances of fixtures or other stationary sensors 727, mobile devices 728, global positioning system (GPS) devices 729, ERI data 735, or extraction logic 745. Such ERI data 735 may include one or more instances of indices 731-732 or other data 733-734 as described below, for example. Such extraction logic 745 may likewise include one or more instances of modules 741, 742, 743, 744 as described below. System 760 may include one or more instances of segment 765 as described below. Referring now to FIG. 7 in conjunction with FIG. 5, logic 547 or system 500 may comprise any such systems 710-780 or hub 790 in some embodiments.

Figure 8:
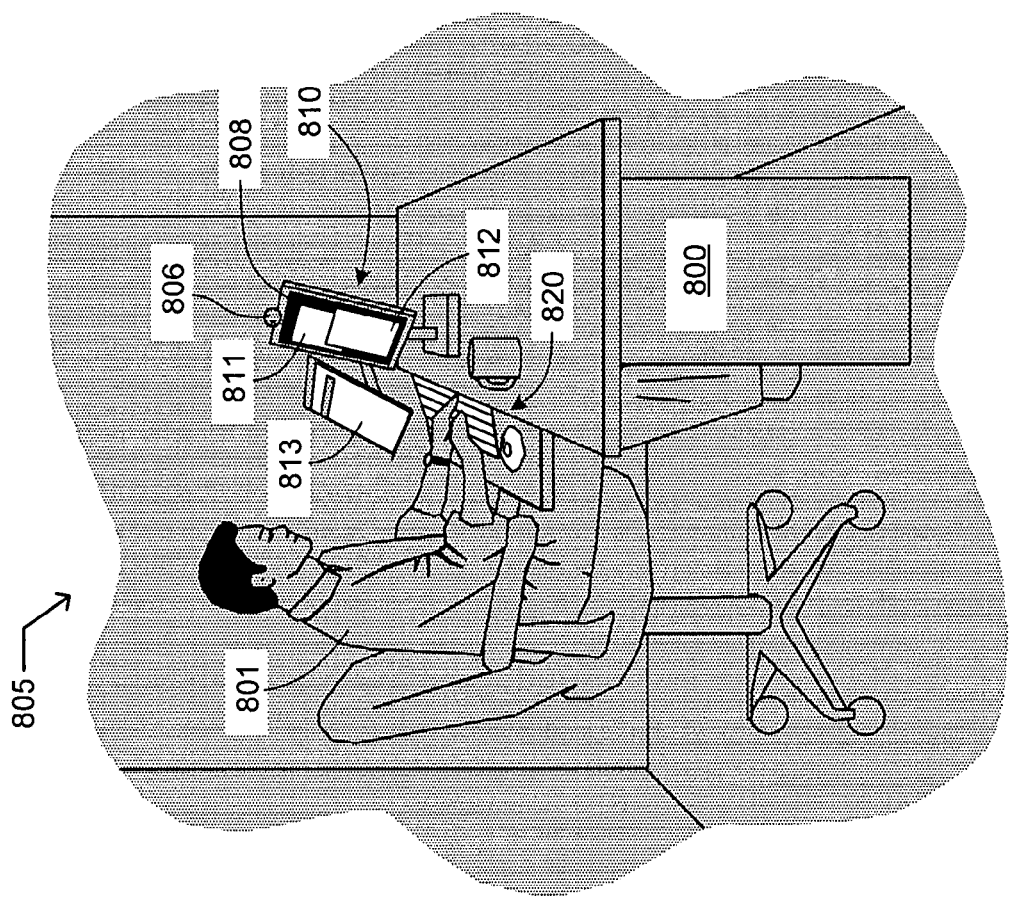

With reference now to FIG. 8, shown is another example of a system that may serve as a context for introducing one or more processes and/or devices described herein. User 801 is shown in an environment 805 of a workstation 800 comprising one or more instances of microphones, cameras, or other sensors 806; display images 808 comprising respective portions 811, 812; output devices 810; documents or other material 813; input devices 820; or the like. Referring again to FIG. 7 in conjunction with FIG. 8, workstation 800 may comprise any such systems 710-780 or hub 790 in some embodiments.

Figure 9:
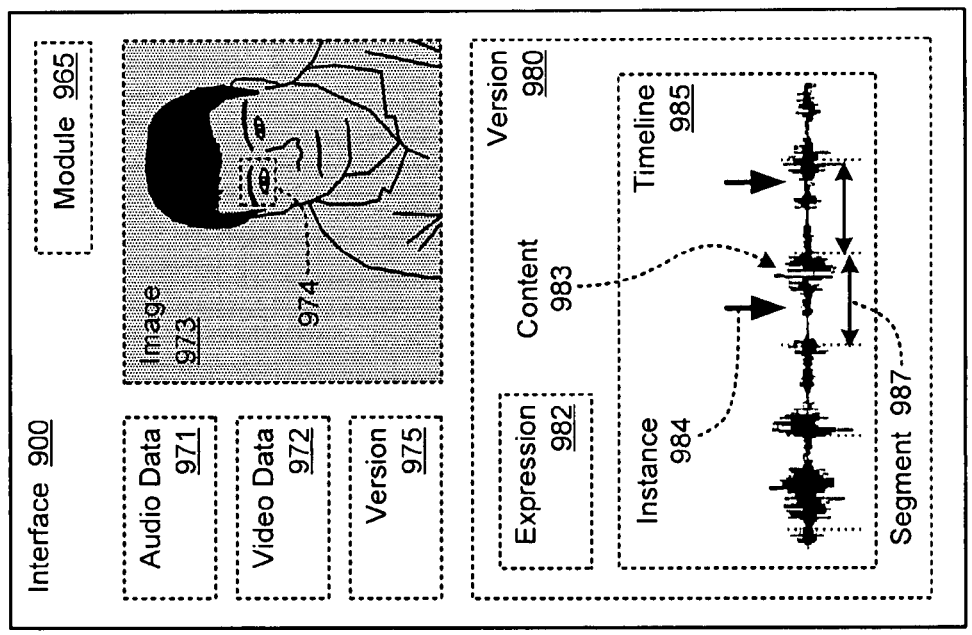

With reference now to FIG. 9, shown is another example of a system that may serve as a context for introducing one or more processes and/or devices described herein. Interface 900 may comprise one or more instances of modules 965, audio data 971, video data 972, or images 973 having portions 974 of interest. As described below, for example, one or more images having even a tiny portion of a user's eyes may (optionally) be cropped so that about 1%-5% or more of the total image data consists of ocular data, preferably in a grayscale or color form. Any such objects of interface 900 may (optionally) include two or more versions 975, 980 in some variants. Version 980 may, for example, comprise two or more distinguishable expressions 982 therein. For a timeline 985 of audio data, one or more instances 984 of phrases or other content 983 can likewise be identified, as can one or more time segments 987 in which each such instance 984 began or ended. Referring again to FIG. 7 in conjunction with FIG. 9, any such systems 710-780 or hub 790 may include one or more instances of interface 900 in some embodiments.

Figure 10:
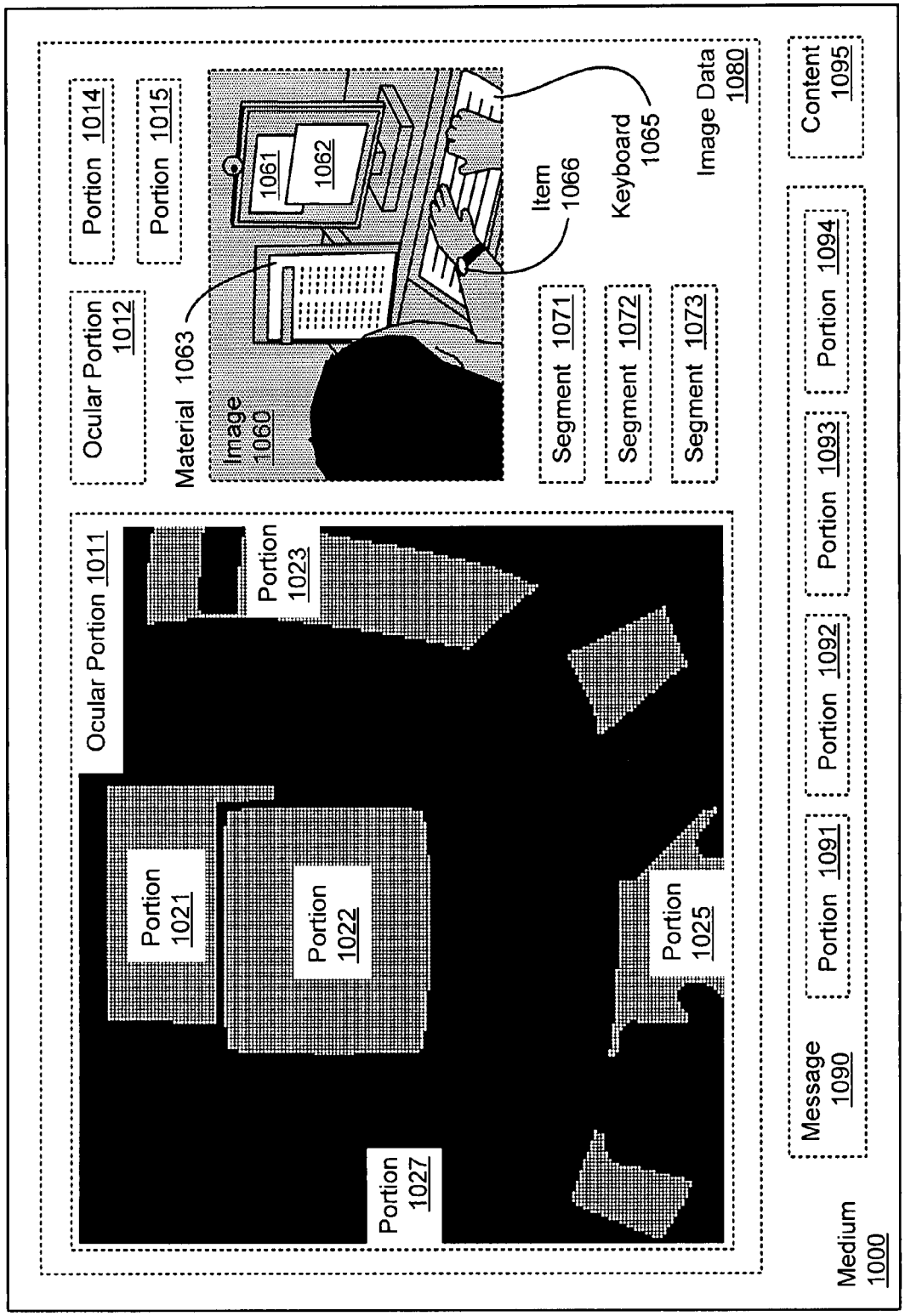

With reference now to FIG. 10, shown is another example of a system that may serve as a context for introducing one or more processes and/or devices described herein. Medium 1000 may comprise one or more instances of image data 1080; sequential portions 1091, 1092, 1093, 1094 of streaming content or other messages 1090; or other content 1095. Image data 1080 may include one or more instances of ocular portions 1011-1012, non-ocular portions 1014-1015 such as image 1060, or other segments 1071, 1072, 1073. Image 1060 may, for example, show display portions 1061-1062, documents or other material 1063, or keyboards 1065 or wearable items 1066.

Ocular portion 1011 constitutes an ocular image generally indicative of a user's field of view reflected in his eye, but slightly smaller than one kilobyte in black-and-white pixel form. This image is coarse but even in this form, it still has several discernable features. For example, image portion 1021 is distinguishable as display portion 1061, image portion 1022 is distinguishable as display portion 1062, image portion 1023 is distinguishable as material 1063, image portion 1025 is distinguishable as keyboard 1065, and image portion 1027 is distinguishable as reflecting darker areas (e.g. in relation to a suitable intensity threshold) in the user's environment. In some embodiments, one or more instances of ocular portions 1012 (or the ocular portion of image portion 974) may comprise respective maps of brightness and/or hue larger than 1 megabyte. Alternatively or additionally, two or more instances of ocular portions 1012 detected within a one-minute period may also suffice for detecting some modes of irregularities, especially if such temporally proximate portions comprise respective maps larger than 1 megabyte in combination. Referring again to FIG. 7 in conjunction with FIG. 10, any such systems 710-780 or hub 790 may implement one or more instances of medium 1000 in some embodiments, as described herein, or medium 1000 may be implemented in isolation.

Figure 11:
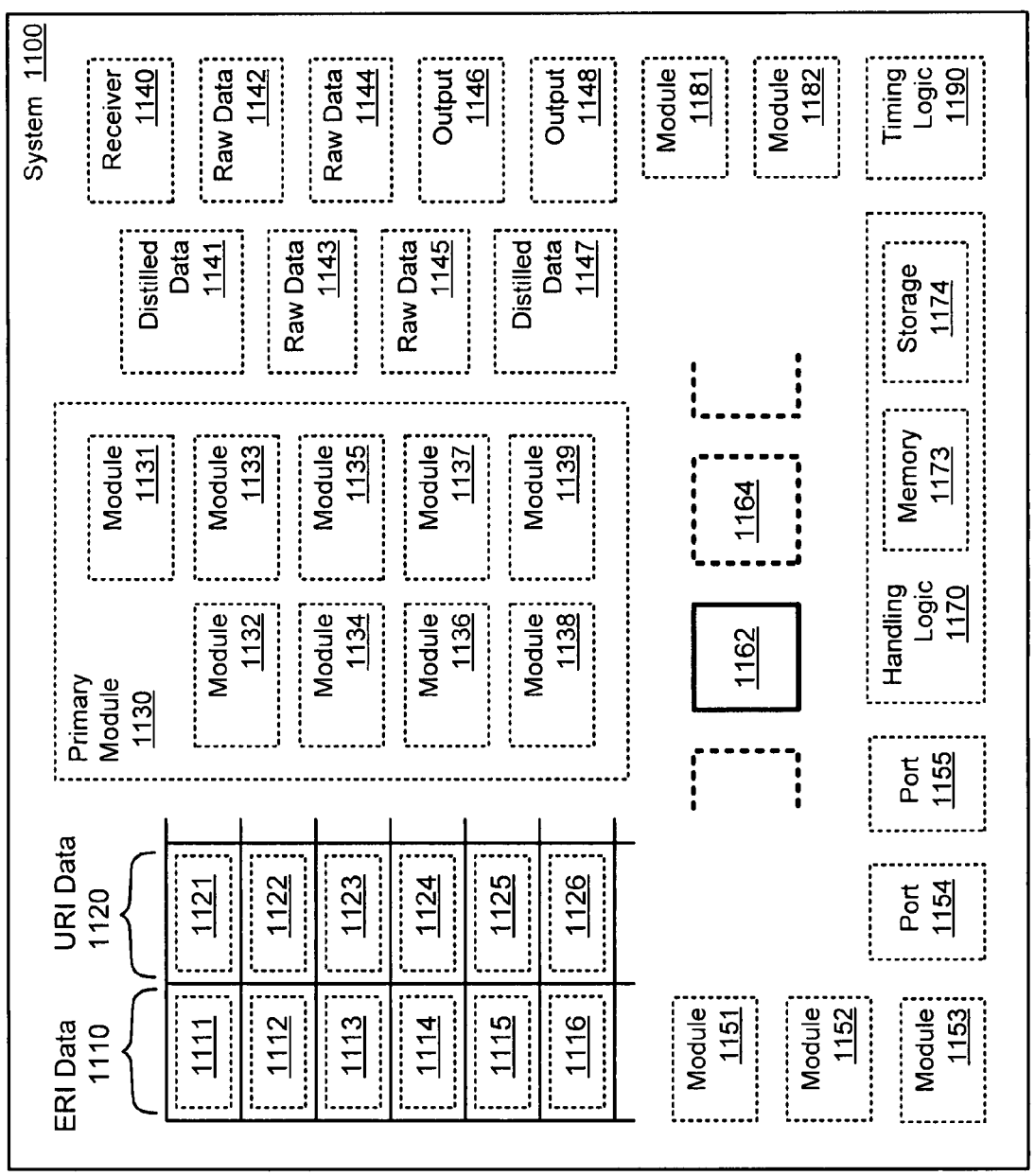
Figure 22:
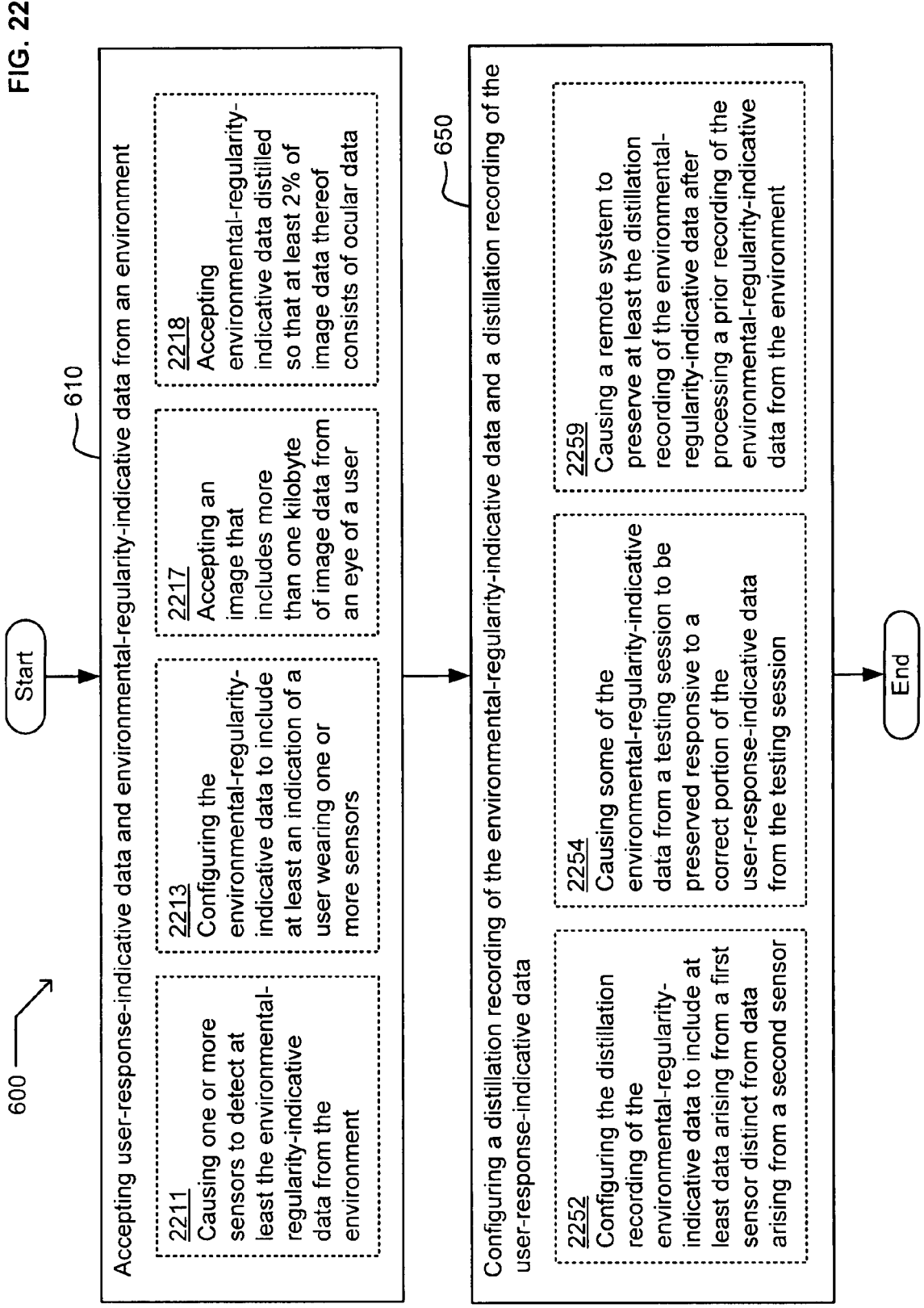
FIGS. 22-23 depict variants of the flow of FIG. 6.
Figure 23:
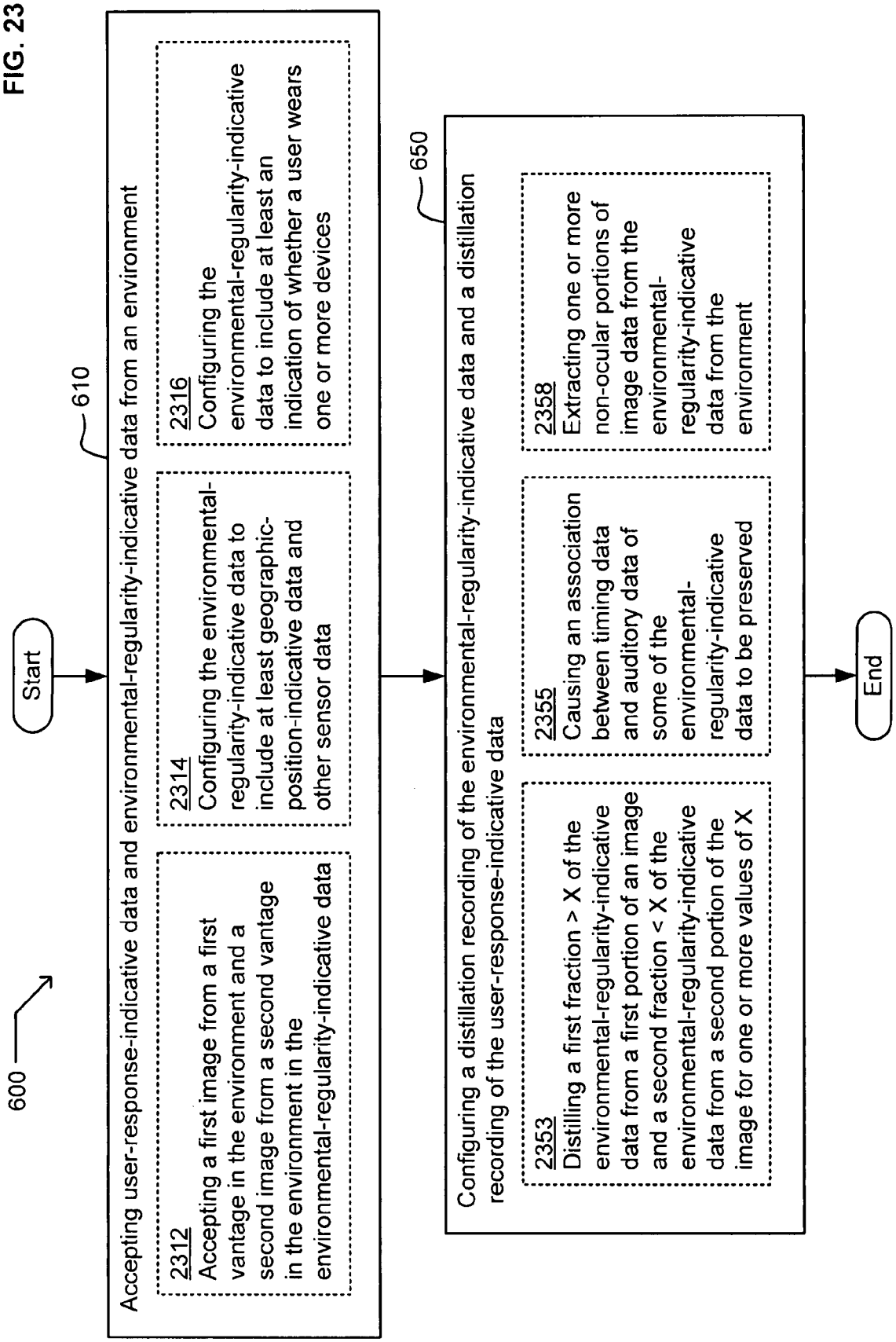

With reference now to FIG. 11, shown is another example of a system that may serve as a context for introducing one or more processes and/or devices described herein. System 1100 may comprise one or more instances of (environmental-regularity-indicative) ERI data 1110; (user-response-indicative) URI data 1120; primary modules 1130; receivers 1140; distilled data 1141, 1147; raw data 1142, 1143, 1144, 1145; output 1146, 1148; modules 1151, 1152, 1153; ports 1154, 1155; processors 1162, 1164; handling logic 1170 operable for interacting with memory 1173 or storage 1174; modules 1181-1182; or timing logic 1190. ERI data 1110 may include one or more instances of data 1111, 1112, 1113, 1114, 1115, 1116 that may be temporally sequential. URI data 1120 may include one or more roughly corresponding instances of data 1121, 1122, 1123, 1124, 1125, 1126 as described below. Primary module 1130 may, moreover, comprise one or more instances of various modules 1131, 1132, 1133, 1134, 1135, 1136, 1137, 1138, 1139 as described below (primarily with reference to FIGS. 22-23). Referring again to FIG. 7 in conjunction with FIG. 11, any such systems 710-780 or hub 790 may comprise system 1100 in some embodiments, as described herein, or system 1100 may be implemented in isolation.

Figure 12:
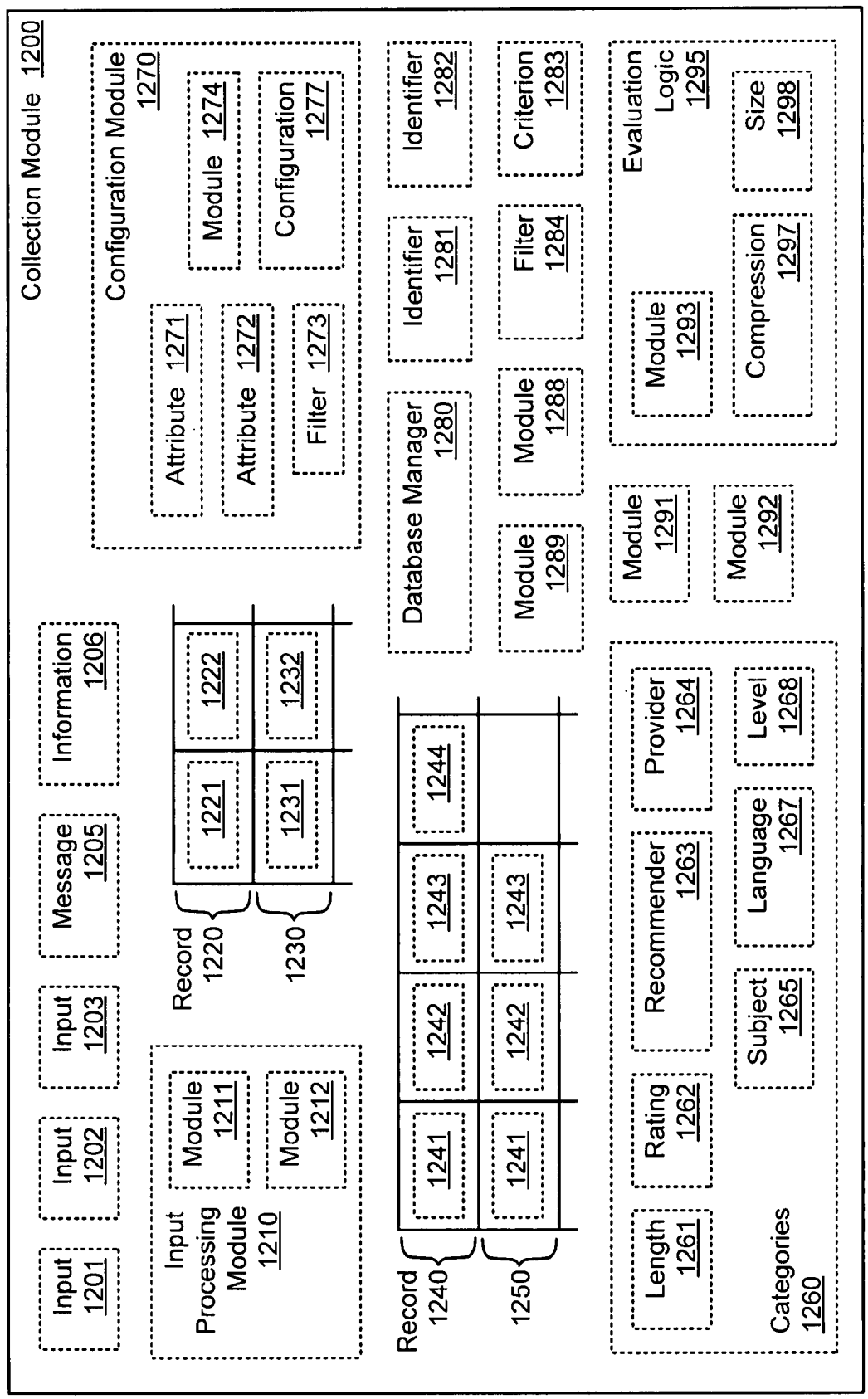

With reference now to FIG. 12, shown is another example of a system that may serve as a context for introducing one or more processes and/or devices described herein. Collection module 1200 may comprise one or more instances of input 1201, 1202, 1203; messages 1205; information 1206; input processing modules 1210 (comprising modules 1211, 1212); records 1220, 1230 respectively relating one or more locations 1221, 1231 at least with one or more pointers or other access objects 1222, 1232; records 1240, 1250 respectively relating two or more fields 1241-1244 (including one or more data fields 1242 and one or more position fields 1243); categories 1260; configuration modules 1270; database managers 1280; identifiers 1281-1282; criteria 1283; filters 1284; modules 1288, 1289, 1291, 1292; or evaluation logic 1295. Categories 1260 may include one or more instances of lengths 1261, ratings 1262, recommenders 1263, providers 1264, subjects 1265, languages 1267, or levels 1268. Configuration module 1270 may comprise one or more instances of attributes 1271-1272, filters 1273, modules 1274, or configurations 1277. Evaluation logic 1295 may comprise one or more instances of modules 1293, compressions 1297, or sizes 1298. Such components of FIG. 12 are further described below, primarily with reference to FIGS. 22-23. Referring again to FIG. 7 in conjunction with FIG. 12, any such systems 710-780 or hub 790 may implement one or more collection modules 1200 in some embodiments, as described herein, or collection module 1200 may be implemented in isolation.

Figure 13:
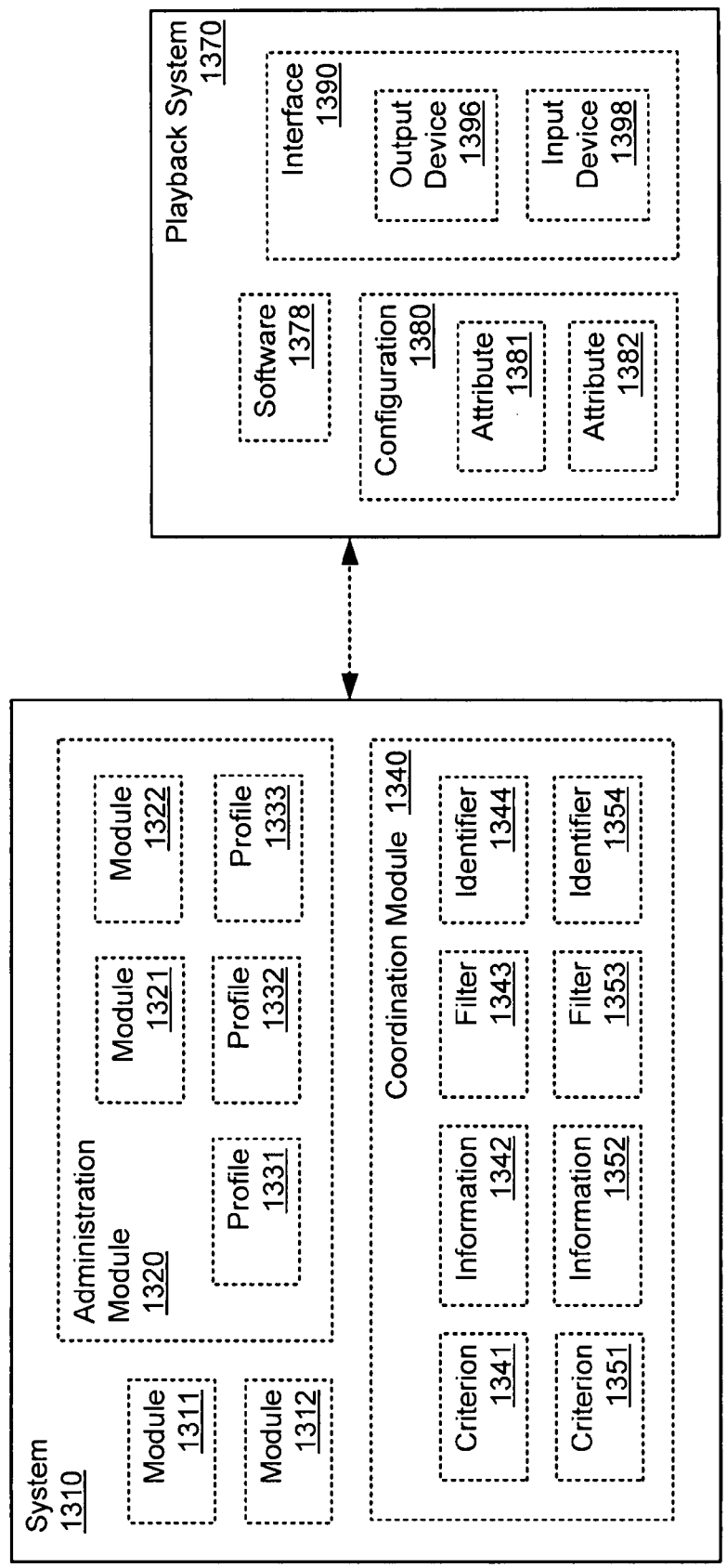

With reference now to FIG. 13, shown is another example of a system that may serve as a context for introducing one or more processes and/or devices described herein. System 1310 may be coupled with playback system 1370 as shown, for example, or may serve as hub 790 (of FIG. 7) for two or more such systems. System 1310 may include one or more instances of administration modules 1320, coordination modules 1340, or other modules 1311-1312. Administration module 1320 may, in turn, comprise one or more instances of modules 1321-1322 or profiles 1331, 1332, 1333 as described below. Coordination module 1340 may include one or more instances of criteria 1341, 1351; information 1342, 1352; filters 1343, 1353; or identifiers 1344, 1354 as described below.

Figure 24:
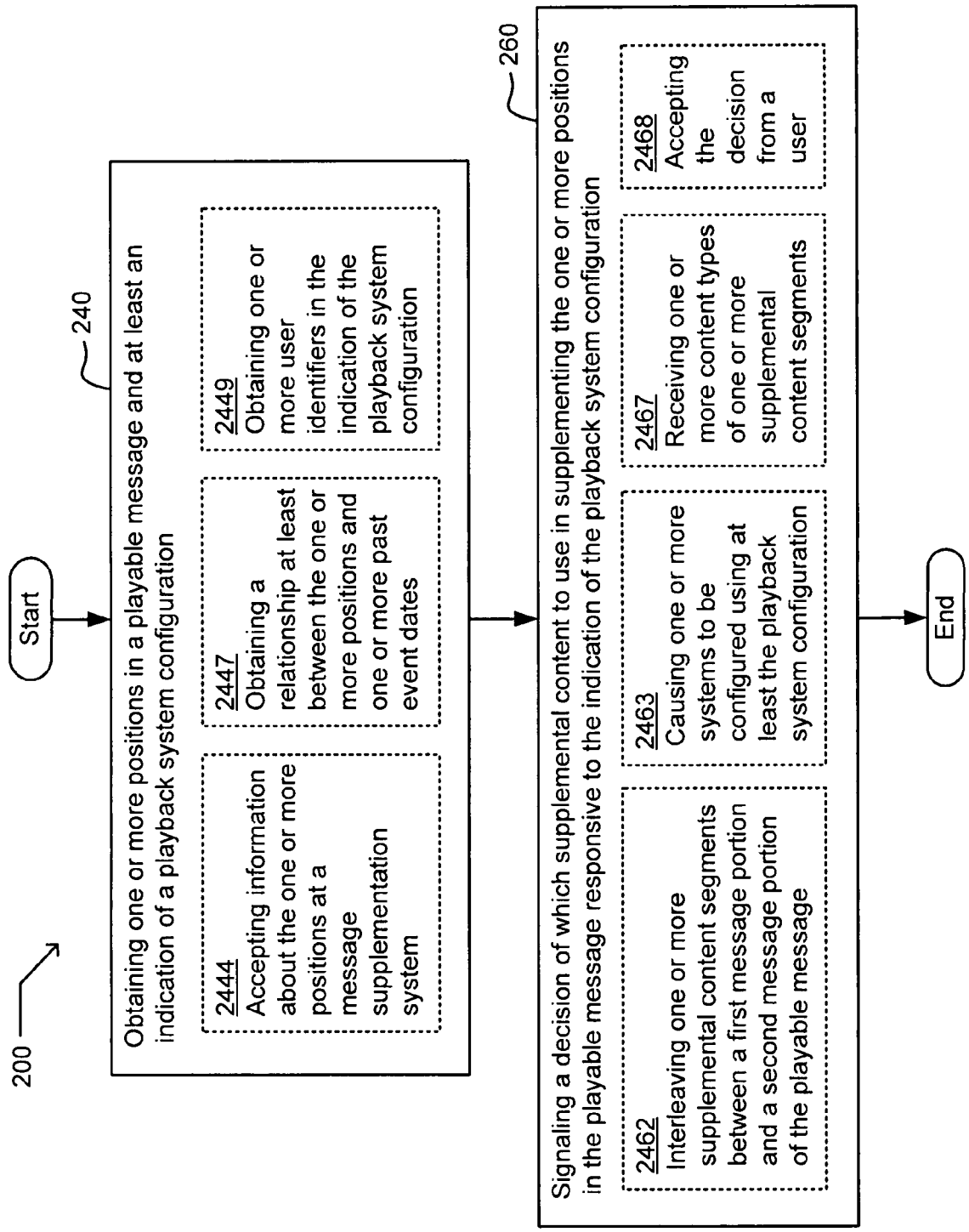

Playback system 1370 may comprise one or more instances of software 1378, configurations 1380, or interfaces 1390—as may any playback features that may be implemented in systems 710-780. Such a configuration 1380 may include one or more attributes 1381-1382. Interface 1390 may include one or more instances of display screens or other output devices 1396 or microphones or other input devices 1398. Such components of FIG. 13 are further described below, primarily with reference to FIGS. 24-25.

Figure 14:
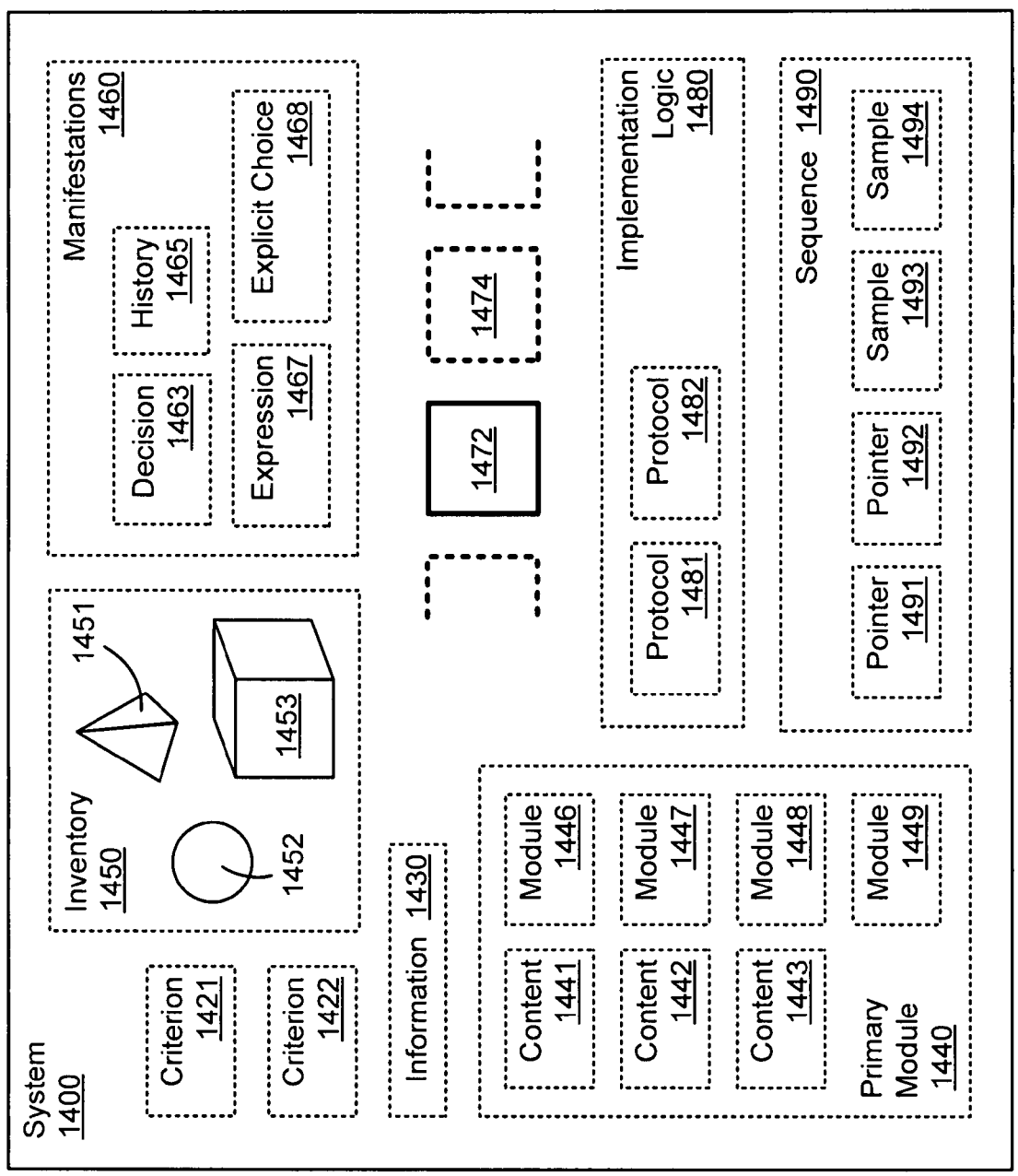

With reference now to FIG. 14, shown is another example of a system that may serve as a context for introducing one or more processes and/or devices described herein. System 1400 may comprise one or more instances of criteria 1421, 1422; information 1430; primary modules 1440; inventory 1450; manifestations 1460; processors 1472, 1474; implementation logic 1480; or sequences 1490. Primary module 1440 may include one or more instances of content 1441, 1442, 1443 or of module 1446, 1447, 1448, 1449 as described below, primarily with reference to FIGS. 24-25. Inventory 1450 may include one or more instances of items 1451, 1452, 1453. Manifestations 1460 (of policies or other preferences) may comprise one or more instances of decisions 1463, history 1465, expressions 1467, or explicit choices 1468. Implementation logic 1480 may comprise one or more instances of protocols 1481-1482. In various embodiments as described herein, sequence 1490 may comprise one or more sequential pairings of successive pointers 1491, 1492; of successive samples 1493, 1494; or of a pointer 1492 that is consecutive with a sample 1493. Any such pointer 1491, 1492 or sample 1493, 1494 may likewise be omitted from sequence 1490, of course. Referring again to FIG. 7 in conjunction with FIG. 14, any such systems 710-780 or hub 790 may comprise one or more instances of system 1400 in some embodiments, as described herein, or system 1400 may be implemented in isolation.

Figure 15:
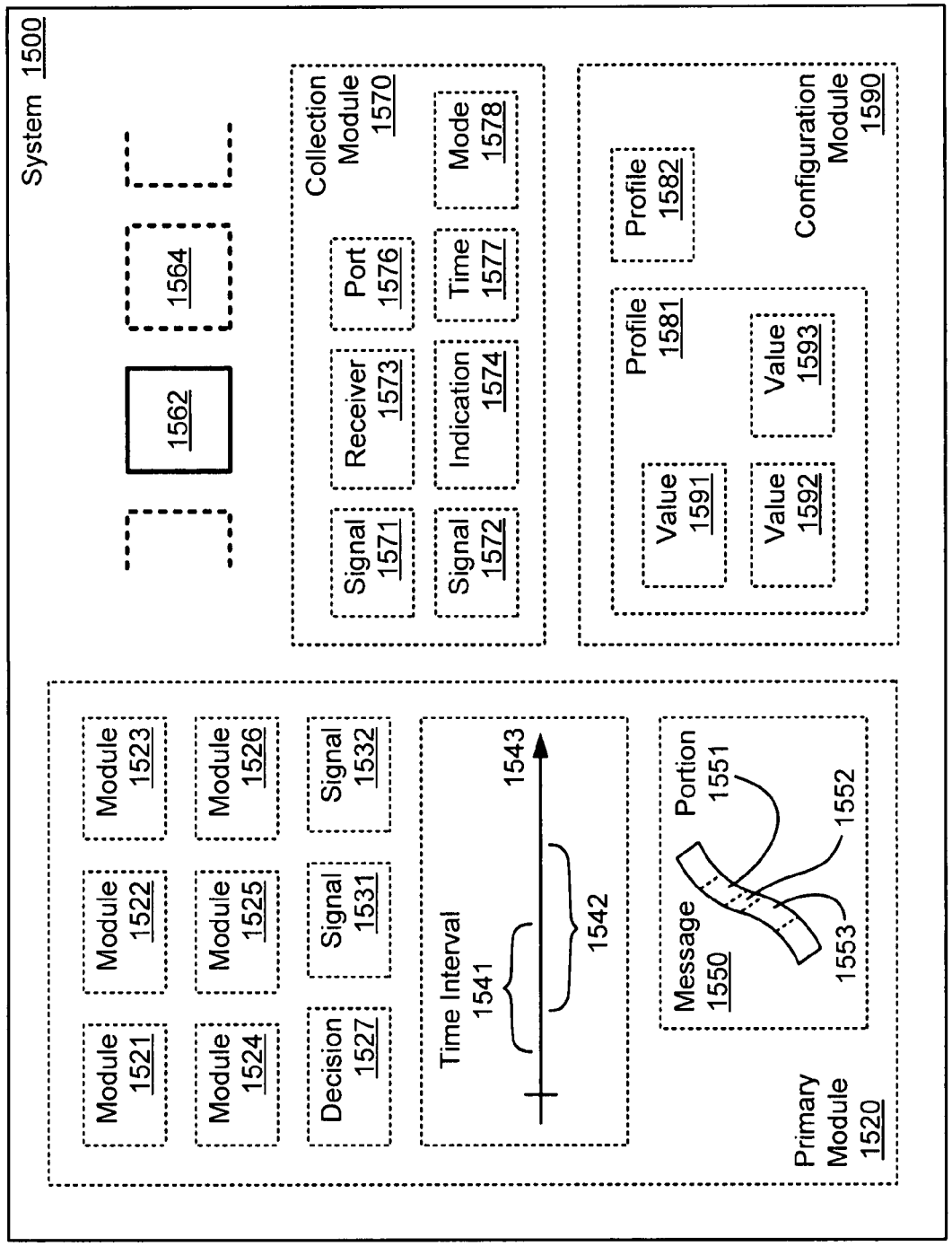
Figure 20:
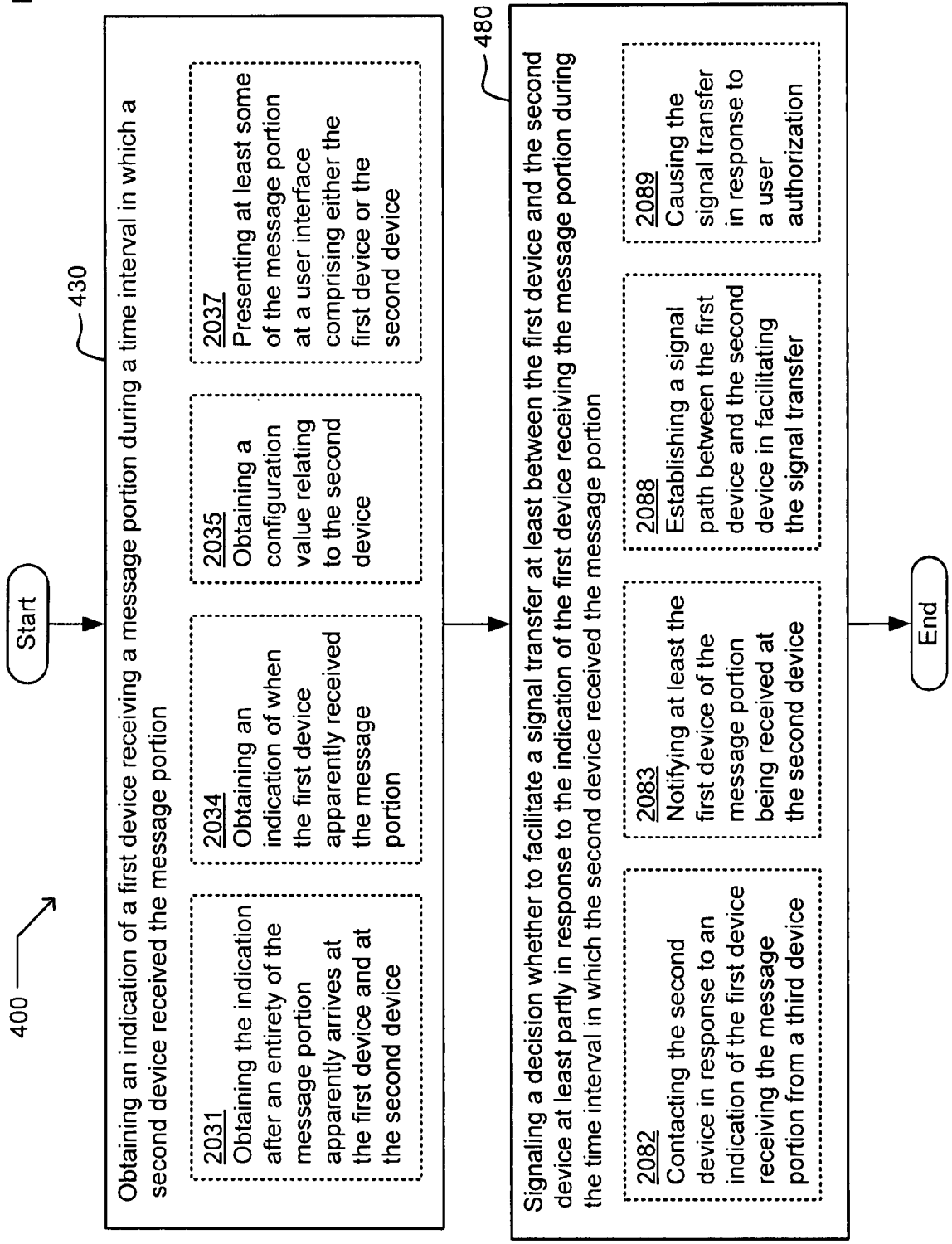
FIGS. 20-21 depict variants of the flow of FIG. 4.
Figure 21:
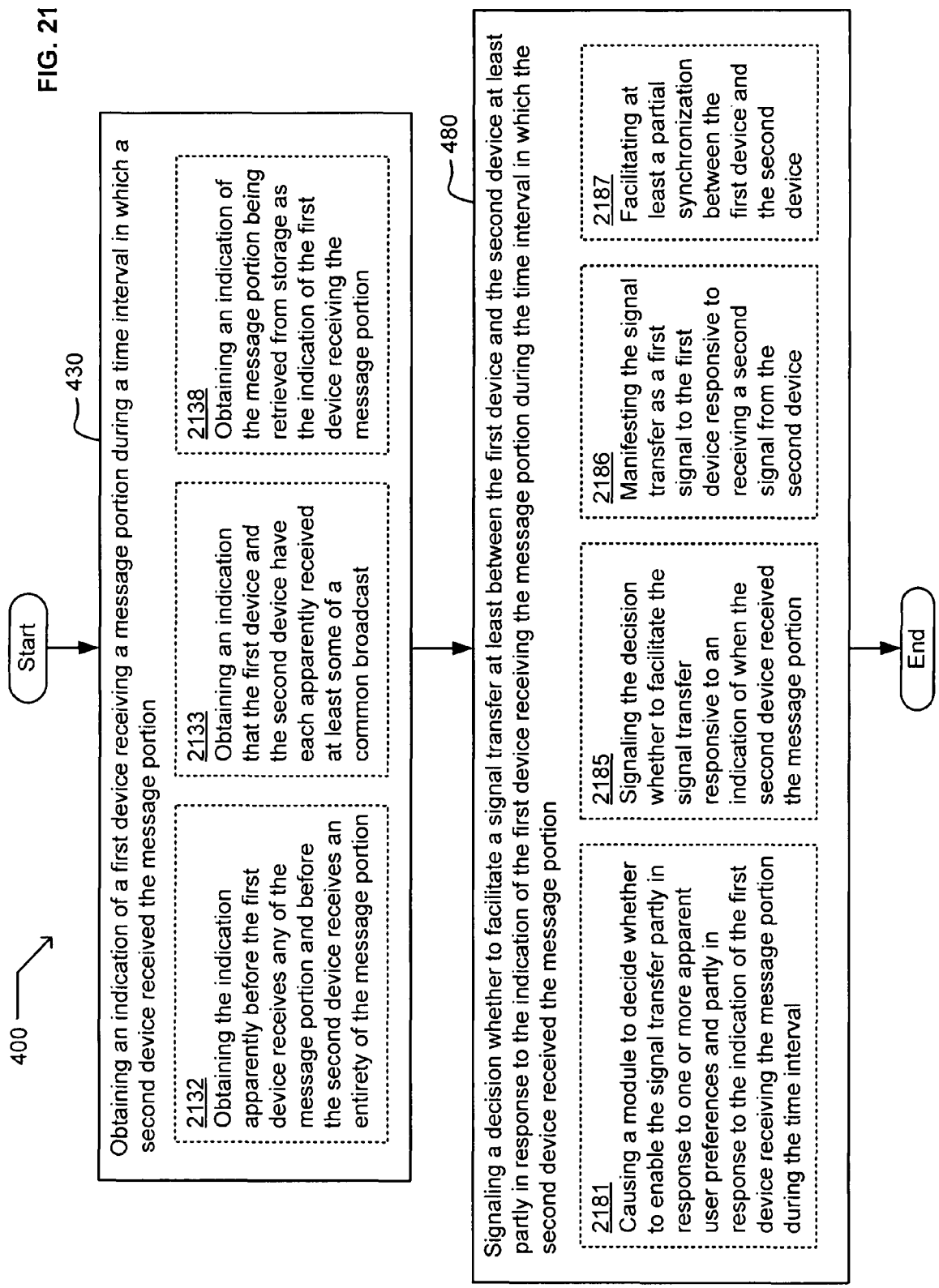

With reference now to FIG. 15, shown is another example of a system that may serve as a context for introducing one or more processes and/or devices described herein. System 1500 may comprise one or more instances of primary modules 1520; processors 1562, 1564; collection modules 1570; or configuration modules 1590. Primary module 1520 may, for example, comprise one or more instances of modules 1521, 1522, 1523, 1524, 1525, 1526; decisions 1527; signals 1531-1532; time intervals 1541-1542 overlapping along a common axis 1543 of time; or messages 1550 having respectively consecutive adjacent portions 1551, 1552, 1553. Collection module 1570 may comprise one or more instances of signals 1571-1572, receivers 1573, indications 1574, ports 1576, times 1577, or modes 1578. Configuration module 1590 may comprise one or more instances of profiles 1581-1582, any of which may comprise one or more values 1591, 1592, 1593. Such components are further described below, primarily with reference to FIGS. 20-21. Referring again to FIG. 7 in conjunction with FIG. 15, any such systems 710-780 or hub 790 may comprise one or more instances of system 1500 in some embodiments, as described herein, or system 1500 may be implemented in isolation.

Figure 16:
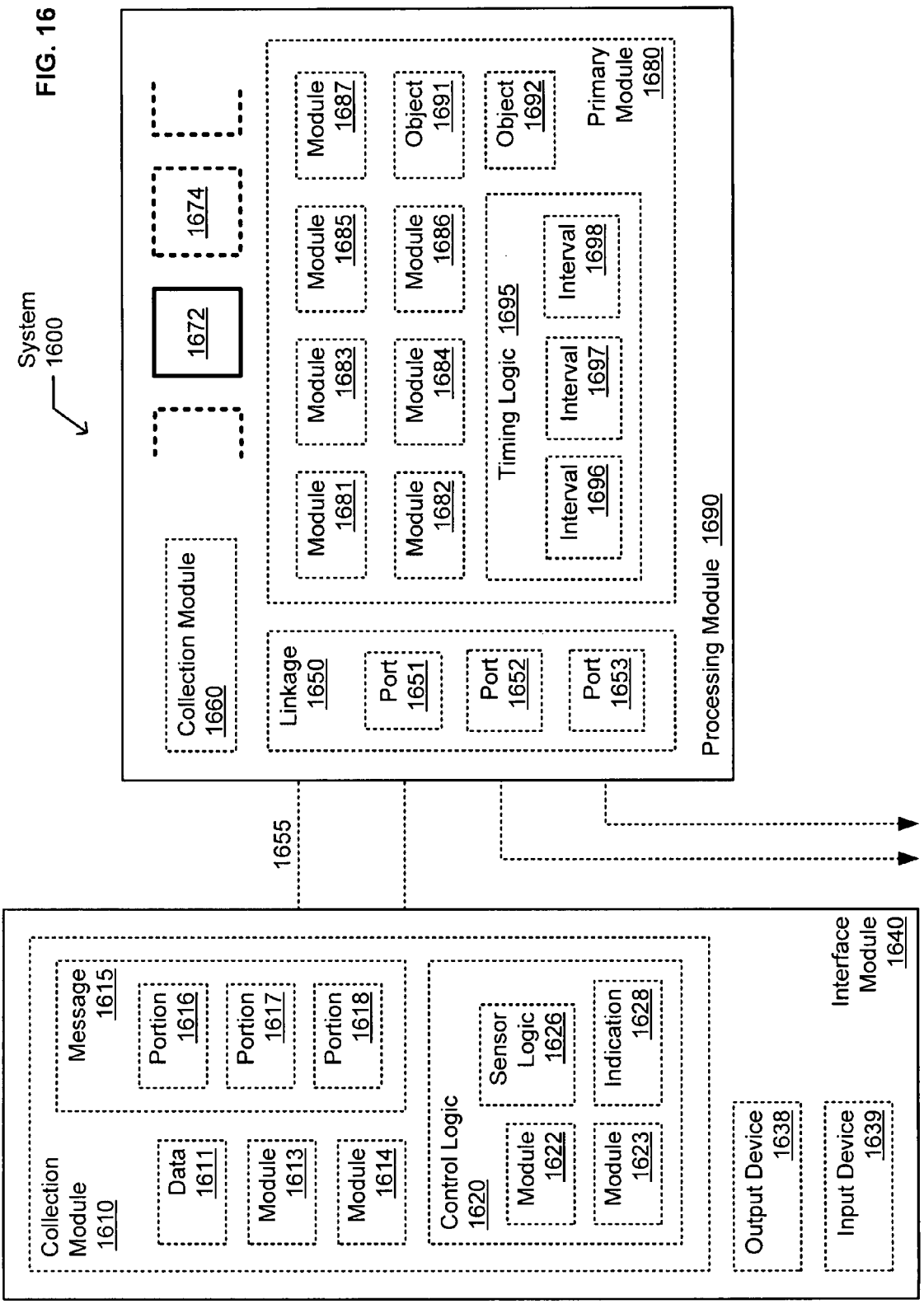

With reference now to FIG. 16, shown is another example of a system that may serve as a context for introducing one or more processes and/or devices described herein. System 1600 may comprise one or more instances of interface modules 1640 (optionally implemented at system 710-720 of FIG. 7, for example) operably coupled with one or more processing modules 1690 (through channel 1655 and optionally implemented at system 760 or hub 790 of FIG. 7, for example). Interface module 1640 may comprise one or more instances of collection modules 1610, a driver or other output device 1638, or a receiver or other input device 1639. Collection module 1610 may comprise one or more instances of data 1611; modules 1613-1614; messages 1615 having respective portions 1616, 1617, 1618; or control logic 1620. Control logic 1620 may comprise one or more instances of modules 1622-1623, sensor logic 1626, or indications 1628. Processing module 1690 may comprise one or more instances of collection modules 1660; processors 1672, 1674; ports 1651, 1652, 1653 or other linkages 1650; or primary modules 1680. Primary module 1680 may comprise one or more instances of modules 1681, 1682, 1683, 1684, 1685, 1686, 1687; timing logic 1695; or other objects 1691-1692. Timing logic 1695 may comprise one or more intervals 1696, 1697, 1698. Such components of system 1600 are further described below, primarily with reference to FIGS. 20-21.

Figure 17:
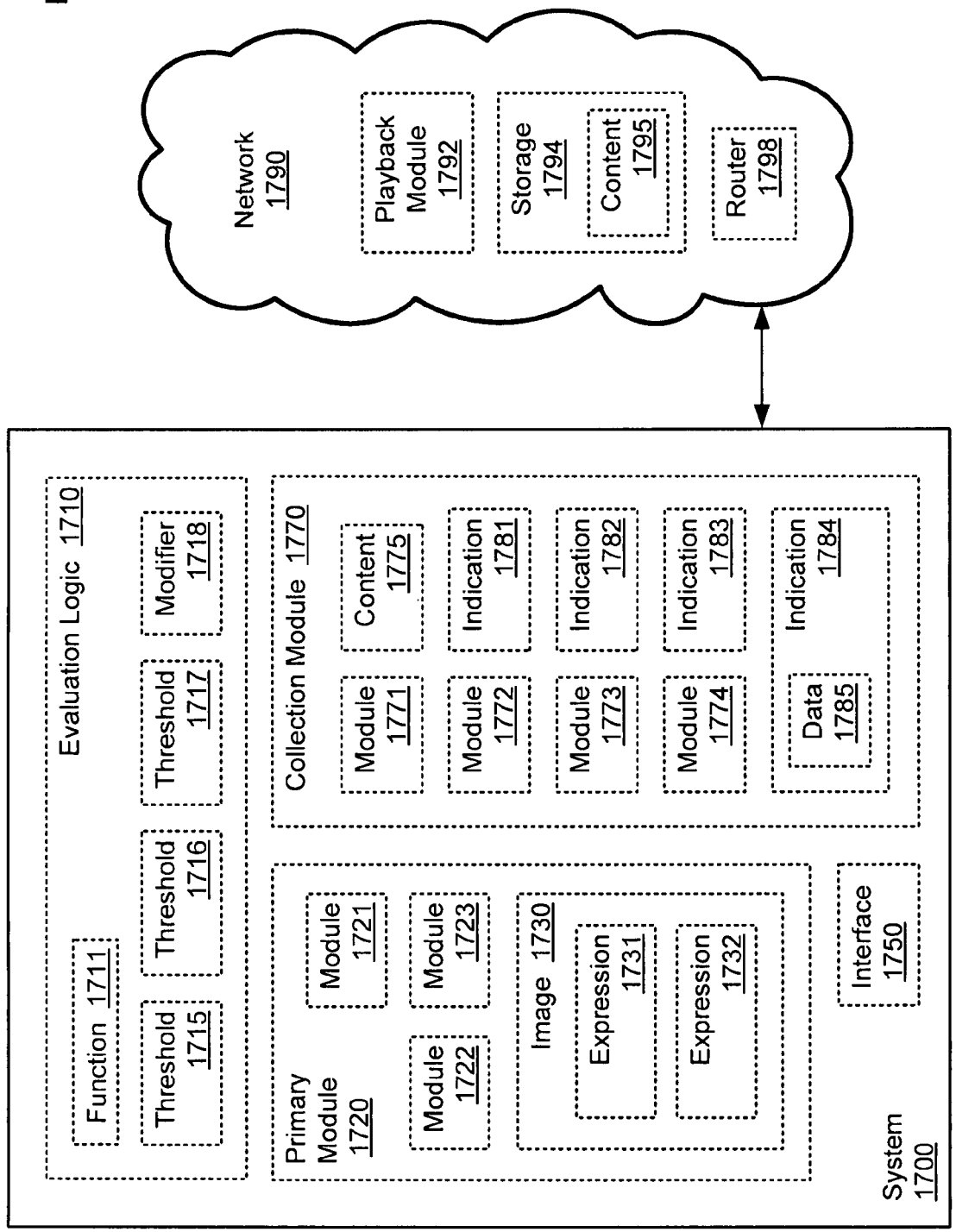

With reference now to FIG. 17, shown is another example of a system that may serve as a context for introducing one or more processes and/or devices described herein. System 1700 may comprise one or more instances of evaluation logic 1710, primary modules 1720, interfaces 1750, or collection modules 1770, some or all of which may interact with network 1790. Evaluation logic 1710 may comprise one or more instances of function 1711; thresholds 1715, 1716, 1717; or modifiers 1718. Primary module 1720 may comprise one or more instances of modules 1721, 1722, 1723 or expressions 1731, 1732 in images 1730. Collection module 1770 may comprise one or more instances of modules 1771, 1772, 1773, 1774; content 1775; or data 1785 or other indications 1781, 1782, 1783, 1784. Network 1790 may comprise one or more instances of playback modules 1792; video or other content 1795 on removable media or other storage 1794; or routers 1798. Such components of system 1700 and network 1790 are further described below, primarily with reference to FIGS. 20-21.

Figure 18:
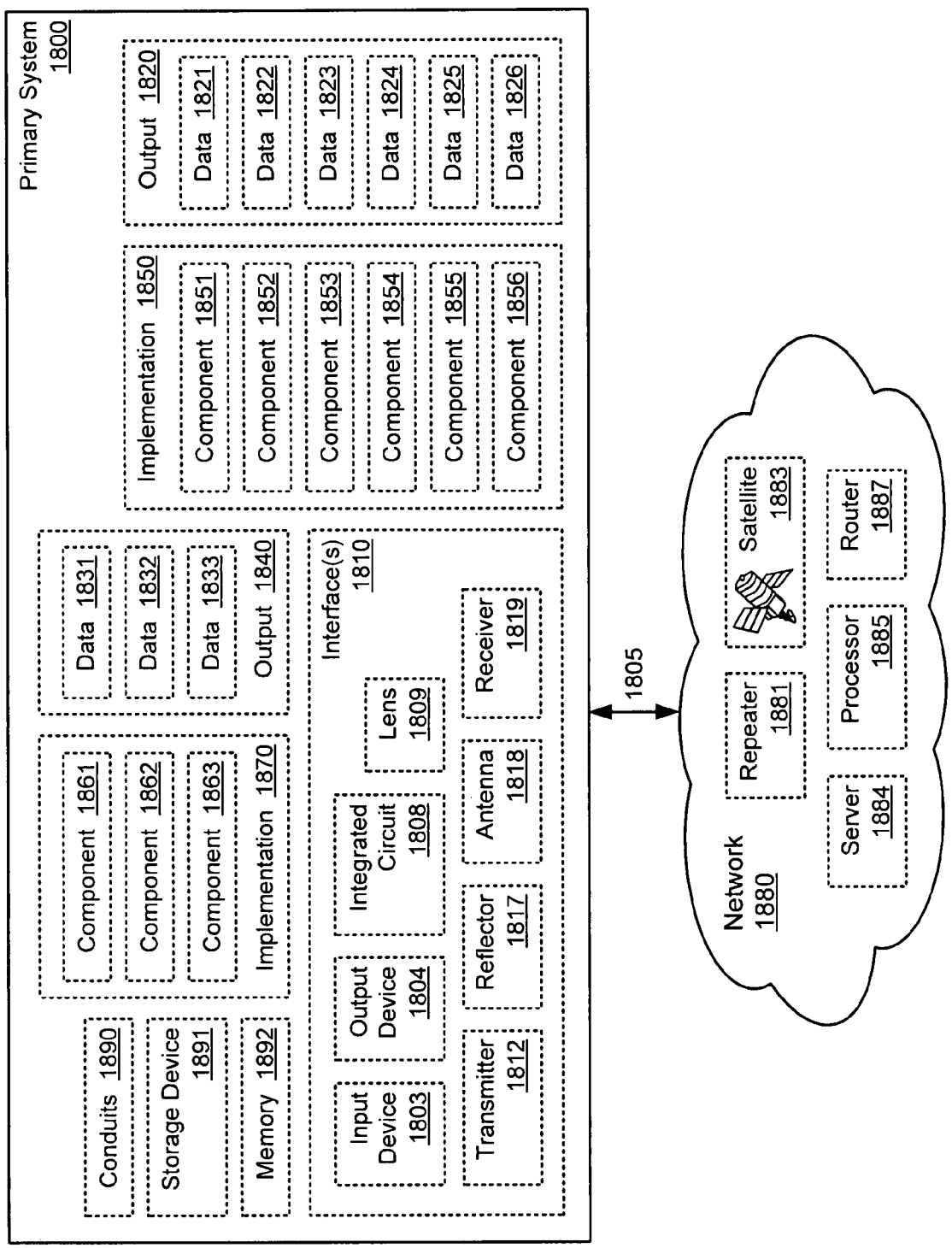

With reference now to FIG. 18, shown is an example of a system that may serve as a context for introducing one or more processes, systems or other articles described herein. Primary system 1800 may include one or more instances of outputs 1820, 1840 or implementations 1850, 1870 that may be held or transmitted by interfaces 1810, conduits 1890, storage devices 1891, memories 1892, or the like. In various embodiments as described herein, for example, one or more instances of implementation output data 1821, 1822, 1823, 1824, 1825, 1826, 1831, 1832, 1833, or implementation components 1851, 1852, 1853, 1854, 1855, 1856, 1861, 1862, 1863 may each be expressed in any aspect or combination of software, firmware, or hardware as signals, data, designs, logic, instructions, or the like. The interface(s) 1810 may include one or more instances of input devices 1803, output devices 1804, integrated circuits 1808, lenses 1809, transmitters 1812, reflectors 1817, antennas 1818, receivers 1819, or the like for handling data or communicating with local users or with network 1880 via linkage 1805, for example. Several variants of primary system 1800 are described below with reference to one or more instances of repeaters 1881, communication satellites 1883, servers 1884, processors 1885, routers 1887, or other elements of network 1880.

Those skilled in the art will recognize that some list items may also function as other list items. In the above-listed types of media, for example, some instances of interface(s) 1810 may include conduits 1890, or may also function as storage devices. Transmitters 1812 may likewise include input devices or bidirectional user interfaces, in many implementations of interface(s) 1810. Each such listed term should not be narrowed by any implication from other terms in the same list but should instead be understood in its broadest reasonable interpretation as understood by those skilled in the art.

Several variants described herein refer to device-detectable "implementations" such as one or more instances of computer-readable code, transistor or latch connectivity layouts or other geometric expressions of logical elements, firmware or software expressions of transfer functions implementing computational specifications, digital expressions of truth tables, or the like. Such instances can, in some implementations, include source code or other human-readable portions. Alternatively or additionally, functions of implementations described herein may constitute one or more device-detectable outputs such as decisions, manifestations, side effects, results, coding or other expressions, displayable images, data files, data associations, statistical correlations, streaming signals, intensity levels, frequencies or other measurable attributes, packets or other encoded expressions, or the like from invoking or monitoring the implementation as described herein.

Referring again to FIG. 2, flow 200 may be performed by one or more instances of server 1884 remote from primary system 1800, for example, but operable to cause output device(s) 1804 to receive and present results via linkage 1805. Alternatively or additionally, device-detectable data 1832 may be borne by one or more instances of signal-bearing conduits 1890, integrated circuits 1808, or the like as described herein. Such data may optionally be configured for transmission by a semiconductor chip or other embodiment of integrated circuit 1808 that contains or is otherwise operatively coupled with antenna 1818 (in a radio-frequency identification tag, for example).

In some variants, some instances of flow 200 may be implemented entirely within primary system 1800, optionally as a stand-alone system. Operation 240 may be implemented by configuring component 1861 as logic for obtaining one or more positions in a playable message and at least an indication of a playback system configuration, for example. This can be accomplished by including special-purpose instruction sequences or special-purpose-circuit designs for this function, for example, in optical or other known circuit fabrication operations, in programming by various known voltage modulation techniques, or otherwise as described herein or known by those skilled in the art. Output data 1831 from such a component in primary system 1800 or network 1880 may be recorded by writing to or otherwise configuring available portions of storage device(s) 1891.

Alternatively or additionally, such specific output data may be transmitted by configuring transistors, relays, or other drivers or conduits 1890 of primary system 1800 to transfer it to component 1862, for example. Component 1862 may perform operation 260 via implementation as logic for signaling a decision of which supplemental content to use in supplementing the one or more positions in the playable message, for example. Implementation output data 1832 from such a component in primary system 1800 or network 1880 may be recorded into available portions of storage device(s) 1891 or sent to component 1863, for example. Output 1840 from flow 200 may likewise include other data as described herein. Each portion of implementation 1850 may likewise include one or more instances of software, hardware, or the like implementing logic that may be expressed in several respective forms as described herein or otherwise understood by those skilled in the art.

Referring again to FIG. 4, some instance of flow 400 may be implemented entirely within primary system 1800. Operation 430 may be implemented by configuring component 1851 as logic for obtaining an indication of a first device receiving a message portion during a time interval in which a second device received the message portion, for example, such as by including special-purpose instruction sequences or special-purpose-circuit designs for this function. Output data 1821 from such a component in primary system 1800 or network 1880 may be recorded into available portions of storage device(s) 1891 or sent to component 1852, for example. Component 1852 may perform operation 480 via implementation as logic for signaling a decision whether to facilitate a signal transfer at least between the first device and the second device, for example. Implementation output data 1822 from such a component in primary system 1800 or network 1880 may be recorded into available portions of storage device(s) 1891 or sent to component 1853, for example. Output 1820 from flow 400 may likewise include other data 1823, 1824 as described herein. Each portion of implementation 1850 may likewise include one or more instances of software, hardware, or the like implementing logic that may be expressed in several respective forms as described herein or otherwise understood by those skilled in the art.

Referring again to FIG. 6, some instance of flow 600 may be implemented entirely within primary system 1800. Operation 610 may be implemented by configuring component 1855 as logic for accepting user-response-indicative data and environmental-regularity-indicative data from an environment, for example, such as by including special-purpose instruction sequences or special-purpose-circuit designs for this function. Output data 1825 from such a component in primary system 1800 or network 1880 may be recorded into available portions of storage device(s) 1891 or sent to component 1856, for example. Component 1856 may perform operation 650 via implementation as logic for configuring a distillation recording of the environmental-regularity-indicative data and a distillation recording of the user-response-indicative data, for example. Implementation output data 1826 from such a component in primary system 1800 or network 1880 may be recorded into available portions of storage device(s) 1891 or sent to component 1854, for example. Output 1820 from flow 600 may likewise include other data as described herein. Each portion of implementation 1850 may likewise include one or more instances of software, hardware, or the like implementing logic that may be expressed in several respective forms as described herein or otherwise understood by those skilled in the art.

In some embodiments, output device 1804 may indicate an occurrence of flow 200 of FIG. 2 concisely as a decision, an evaluation, an effect, an hypothesis, a probability, a notification, or some other useful technical result. For example, such "indicating" may comprise such modes as showing, signifying, acknowledging, updating, explaining, associating, or the like in relation to any past or ongoing performance of such actions upon the common item(s) as recited. Such indicating may also provide one or more specifics about the occurrence: the parties or device(s) involved, a description of the method or performance modes used, any sequencing or other temporal aspects involved, indications of resources used, location(s) of the occurrence, implementation version indications or other update-indicative information, or any other such contextual information that may be worthwhile to provide at potential output destinations.

Concise indication may occur, for example, in a context in which at least some items of data 1821-1833 do not matter, or in which a recipient may understand or access portions of data 1821-1833 without receiving a preemptive explanation of how it was obtained. By distilling output 1820 or output 1840 at an "upstream" stage (which may comprise integrated circuit 1808, for example, in some arrangements), downstream-stage media (such as other elements of network 1880, for example) may indicate occurrences of various methods described herein more effectively. Variants of flow 200, for example, may be enhanced by distillations described herein, especially in bandwidth-limited transmissions, security-encoded messages, long-distance transmissions, complex images, or compositions of matter bearing other such expressions.

In some variants, a local implementation comprises a service operable for accessing a remote system running a remote implementation. In some embodiments, such "accessing" may include one or more instances of establishing or permitting an interaction between the server and a local embodiment such that the local embodiment causes or uses another implementation or output of one or more herein-described functions at the server. Functioning as a web browser, remote terminal session, or other remote activation or control device, for example, interface(s) 1810 may interact with one or more primary system users via input and output devices 1803, 1804 so as to manifest an implementation in primary system 1800 via an interaction with server 1884, for example, running a secondary implementation of flow 200. Such local implementations may comprise a visual display supporting a local internet service to the remote server, for example. Such a remote server may control or otherwise enable one or more instances of hardware or software operating the secondary implementation outside a system, network, or physical proximity of primary system 1800. For a building implementing primary system 1800, for example, "remote" devices may include those in other countries, in orbit, or in adjacent buildings. In some embodiments, "running an implementation" may include invoking one or more instances of software, hardware, firmware, or the like atypically constituted or adapted to facilitate methods or functions as described herein. For example, primary system 1800 running an implementation of flow 200 may be a remote activation of a special-purpose computer program resident on server 1884 via an internet browser session interaction through linkage 1805, mediated by input device 1803 and output device 1804.

In some variants, some or all of components 1851-1856 and 1861-1863 may be borne in various data-handling elements—e.g., in one or more instances of storage devices 1891, in memories 1892 or volatile media, passing through linkage 1805 with network 1880 or other conduits 1890, in one or more registers, or the like. For example, such processing or configuration may occur in response to user data or the like received at input device 1803 or may be presented at output device 1804. Instances of input devices 1803 may (optionally) include one or more instances of cameras or other optical devices, hand-held systems or other portable systems, keypads, sensors, or the like as described herein. Output device(s) 1804 may likewise include one or more instances of image projection modules, touch screens, wrist-wearable systems or the like adapted to be worn while in use, headphones and speakers, eyewear, liquid crystal displays (LCDs), actuators, lasers, organic or other light-emitting diodes, phosphorescent elements, portions of (hybrid) input devices 1803, or the like.

A device-detectable implementation of variants described herein with reference to flows 200, 400, 600, for example, may be divided into several components 1851-1856 and 1861-1863 carried by one or more instances of active modules such as signal repeaters 1881, communication satellites 1883, servers 1884, processors 1885, routers 1887, or the like. For example, in some embodiments, component 1862 may be borne by an "upstream" module (e.g., repeater 1881 or the like) while or after component 1861 is borne in a "downstream" module (e.g., another instance of repeater 1881, communication satellite 1883, server 1884, or the like). Such downstream modules may "accept" such bits or other portions of implementation 1850 or implementation 1870 sequentially, for example, such as by amplifying, relaying, storing, checking, or otherwise processing what was received actively. Sensors and other "upstream" modules may likewise "accept" raw data, such as by measuring physical phenomena or accessing one or more databases.

In some embodiments, a medium bearing data (or other such event) may be "caused" (directly or indirectly) by one or more instances of prior or contemporaneous measurements, decisions, transitions, circumstances, or other causal determinants. Any such event may likewise depend upon one or more other prior, contemporaneous, or potential determinants, in various implementations as taught herein. In other words, such events may occur "in response" to both preparatory (earlier) events and triggering (contemporaneous) events in some contexts. Output 1840 may result from more than one component of implementations 1850, 1870 or more than one operation of flow 200, for example.

In some embodiments, such integrated circuits 1808 may comprise transistors, capacitors, amplifiers, latches, converters, or the like on a common substrate of a semiconductor material, operable to perform computational tasks or other transformations. An integrated circuit may be application-specific ("ASIC") in that it is designed for a particular use rather than for general purpose use. An integrated circuit may likewise include one or more instances of memory circuits, processors, field-programmable gate arrays (FPGA's), antennas, or other components, and may be referred to as a system-on-a-chip ("SoC").

In some embodiments, one or more instances of integrated circuits or other processors may be configured to perform auditory pattern recognition. In FIG. 18, for example, instances of the one or more input devices 1803 may include a microphone or the like operable to provide auditory samples in data 1831-1839. Some form or portion of such output may be provided remotely, for example, to one or more instances of neural networks or other configurations of remote processors 1885 operable to perform automatic or supervised speech recognition, selective auditory data retention or transmission, or other auditory pattern recognition, upon the samples. Alternatively or additionally such sound-related data may include annotative information relating thereto such as a capture time or other temporal indications, capture location or other source information, language or other content indications, decibels or other measured quantities, pointers to related data items or other associative indications, or other data aggregations or distillations as described herein.

In some embodiments, one or more instances of integrated circuits or other processors may be configured for optical image pattern recognition. In FIG. 18, for example, instances of lenses 1809 or other input devices 1803 may include optical sensors or the like operable to provide one or more of geometric, hue, or optical intensity information in data 1831-1839. Some form or portion of such output may be provided locally, for example, to one or more instances of optical character recognition software, pattern recognition processing resources, or other configurations of integrated circuits 1808 operable to perform automatic or supervised image recognition, selective optical data retention or transmission, or the like. Alternatively or additionally such image-related data may include annotative information relating thereto such as a capture time or other temporal indications, capture location or other source information, language or other content indications, pointers to related data items or other associative indications, or other data aggregations or distillations as described herein.

In some embodiments, one or more instances of integrated circuits or other processors may be configured to perform linguistic pattern recognition. In FIG. 18, for example, instances of input devices 1803 may include keys, pointing devices, microphones, sensors, reference data, or the like operable to provide spoken, written, or other symbolic expressions in data 1831-1839. Some form or portion of such output may be provided locally, for example, to one or more instances of translation utilities, compilers, or other configurations of integrated circuits 1808 operable to perform automatic or supervised programming or other language recognition, selective linguistic data retention or transmission, or the like. Alternatively or additionally such language-related data may include annotative information relating thereto such as a capture time or other temporal indications, capture location or other source information, language or other content indications, pointers to related data items or other associative indications, or other data classifications, aggregations, or distillations as described herein. In some embodiments, one or more antennas 1818 or receivers 1819 may include a device that is the receiving end of a communication channel as described herein. For example, such a receiver may gather a signal from a dedicated conduit or from the environment for subsequent processing and/or retransmission. As a further example, such antennas or other receivers may include one or more instances of wireless antennas, radio antennas, satellite antennas, broadband receivers, digital subscriber line (DSL) receivers, modem receivers, transceivers, or configurations of two or more such devices for data reception as described herein or otherwise known.

In one variant, two or more respective portions of output data 1831-1839 may be sent from server 1884 through respective channels at various times, one portion passing through repeater 1881 and another through router 1887. Such channels may each bear a respective portion of a data aggregation or extraction, a publication, a comparative analysis or decision, a record selection, digital subscriber content, statistics or other research information, a resource status or potential allocation, an evaluation, an opportunity indication, a test or computational result, or another output 1820,1840 of interest. Such distributed media may be implemented as an expedient or efficient mode of bearing such portions of output data to a common destination such as interface 1810 or a data holding device. Alternatively or additionally, some such data may be transported by moving a medium (carried on storage device 1891, for example) so that only a small portion (a purchase or other access authorization, for example, or a contingent or supplemental module) is transferred via linkage 1805.

In some embodiments, one or more instances of signal repeaters 1881 may include a device or functional implementation that receives a signal and transmits some or all of the signal with one or more of an altered strength or frequency, or with other modulation (e.g., an optical-electrical-optical amplification device, a radio signal amplifier or format converter, a wireless signal amplifier, or the like). A repeater may convert analog to digital signals or digital to analog signals, for example, or perform no conversion. Alternatively or additionally, a repeater may reshape, retime or otherwise reorder an output for transmission. A repeater may likewise introduce a frequency offset to an output signal such that the received and transmitted frequencies are different. A repeater also may include one or more instances of a relay, a translator, a transponder, a transceiver, an active hub, a booster, a noise-attenuating filter, or the like.

In some embodiments, such communication satellite(s) 1883 may be configured to facilitate telecommunications while in a geosynchronous orbit, a Molniya orbit, a low earth orbit, or the like. Alternatively or additionally, a communication satellite may receive or transmit, for example, telephony signals, television signals, radio signals, broadband telecommunications signals, or the like.

In some variants, processor 1885 or any components 1851-1856 and 1861-1863 of implementations 1850, 1870 may (optionally) be configured to perform flow variants as described herein with reference to FIGS. 20-25. An occurrence of such a variant can be expressed as a computation, a transition, or as one or more other items of data 1831-1839 described herein. Such output 1820,1840 can be generated, for example, by depicted components of primary system 1800 or network 1880 including one or more features as described with reference to FIGS. 7-17.

Figure 19:
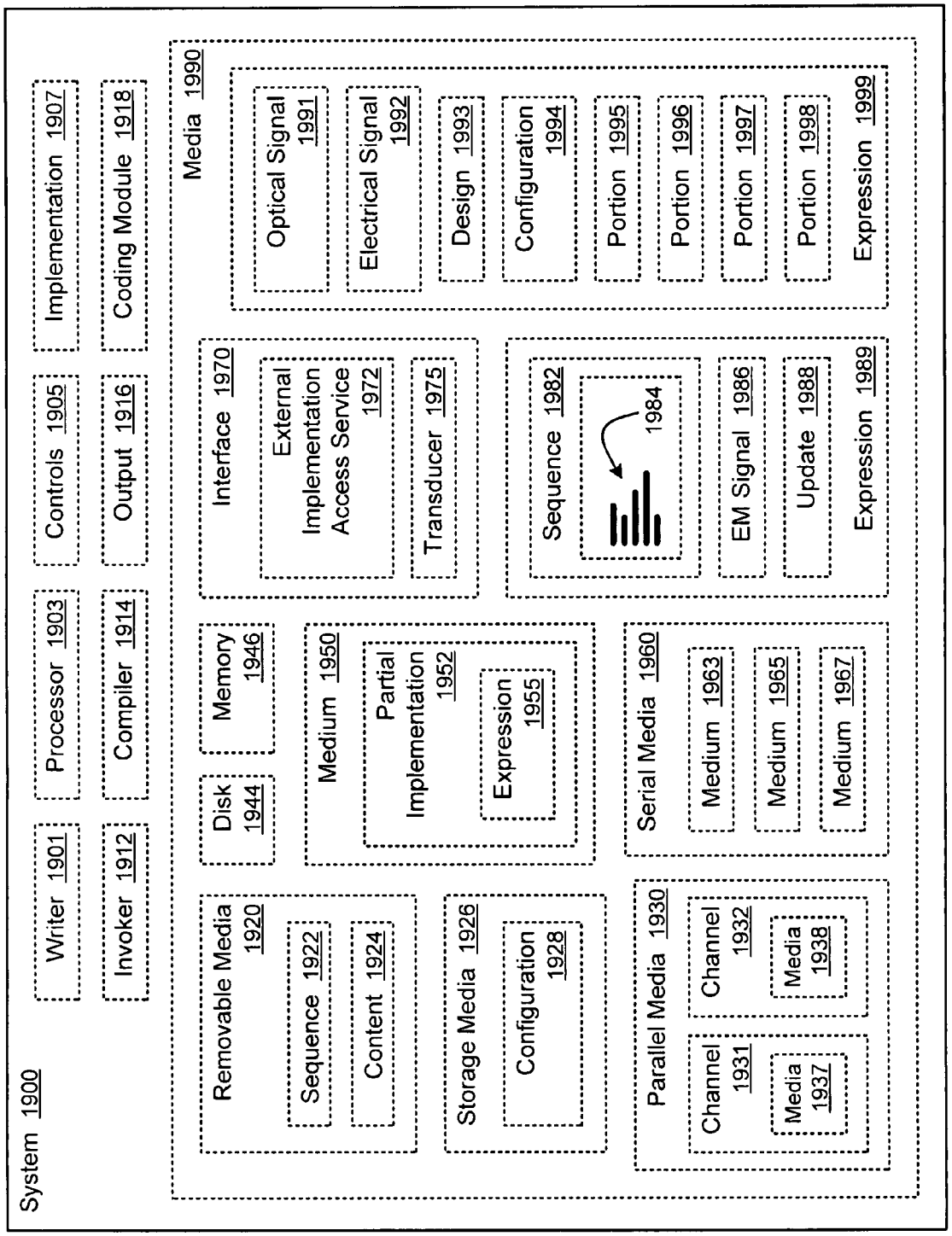

With reference now to FIG. 19, shown is an example of another system that may serve as a context for introducing one or more processes, systems or other articles described herein. As shown system 1900 comprises one or more instances of writers 1901, processors 1903, controls 1905, software or other implementations 1907, invokers 1912, compilers 1914, outputs 1916, coding modules 1918, or the like with one or more media 1990 bearing expressions or outputs thereof. In some embodiments, such media may include distributed media bearing a divided or otherwise distributed implementation or output. For example, in some embodiments, such media may include two or more physically distinct solid-state memories, two or more transmission media, a combination of such transmission media with one or more data-holding media configured as a data source or destination, or the like.

In some embodiments, transmission media may be "configured" to bear an output or implementation (a) by causing a channel in a medium to convey a portion thereof or (b) by constituting, adapting, addressing, or otherwise linking to such media in some other mode that depends upon one or more atypical traits of the partial or whole output or implementation. Data-holding elements of media may likewise be "configured" to bear an output or implementation portion (a) by holding the portion in a storage or memory location or (b) by constituting, adapting, addressing, or otherwise linking to such media in some other mode that depends upon one or more atypical traits of the partial or whole output or implementation. Such atypical traits may include a name, address, portion identifier, functional description, or the like sufficient to distinguish the output, implementation, or portion from a generic object.

In some embodiments described herein, "logic" and similar implementations can include software or other control structures operable to guide device operation. Electronic circuitry, for example, can manifest one or more paths of electrical current constructed and arranged to implement various logic functions as described herein. In some embodiments, one or more media are "configured to bear" a device-detectable implementation if such media hold or transmit a special-purpose device instruction set operable to perform a novel method as described herein. Alternatively or additionally, in some variants, an implementation may include special-purpose hardware or firmware components or general-purpose components executing or otherwise invoking special-purpose components. Specifications or other implementations may be transmitted by one or more instances of transmission media as described herein, optionally by packet transmission or otherwise by passing through distributed media at various times.

In some embodiments, one or more of the coding modules 1918 may be configured with circuitry for applying, imposing, or otherwise using a syntactic or other encoding constraint in forming, extracting, or otherwise handling respective portions of the device-detectable implementation or output. In encoding a software module or other message content, for example, compiler 1914 or coding module 1918 may implement one or more such constraints pursuant to public key or other encryption, applying error correction modes, certifying or otherwise annotating the message content, or implementing other security practices described herein or known by those skilled in the art. Alternatively or additionally, another instance of coding module 1918 may be configured to receive data (via receiver 1819, e.g.) and decode or otherwise distill the received data using one or more such encoding constraints. Compiler 1914 may, in some variants, convert one or more of components 1851-1856 and 1861-1863 from a corresponding source code form before the component(s) are transmitted across linkage 1805.

System 1900 may be implemented, for example, as one or more instances of stand-alone workstations, servers, vehicles, portable devices, removable media 1920, as components of primary system 1800 or network 1880 (of FIG. 18), or the like. Alternatively or additionally, media 1990 may include one or more instances of signal repeaters 1881, communication satellites 1883, servers 1884, processors 1885, routers 1887, portions of primary system 1800 as shown, or the like.

Media 1990 may include one or more instances of removable media 1920, tapes or other storage media 1926; parallel (transmission) media 1930; disks 1944; memories 1946; other data-handling media 1950; serial media 1960; interfaces 1970; or expressions 1989, 1999. Removable media 1920 can bear one or more device-detectable instances of instruction sequences 1922 or other implementations of flow 200 or flow 400, for example. Alternatively or additionally, in some embodiments, removable media 1920 can bear alphanumeric data, audio data, image data, structure-descriptive values, or other content 1924 in a context that indicates an occurrence of one or more flows 200, 400, 600. In some circumstances, transmission media may bear respective portions of implementations as described herein serially or otherwise non-simultaneously. In some variants in which two portions 1997, 1998 constitute a partial or complete software implementation or product of a novel method described herein, portion 1997 may follow portion 1998 successively through serial media 1963, 1965, 1967 (with transmission of portion 1997 partly overlapping in time with transmission of portion 1998 passing through medium 1963, for example). As shown, parallel channels 1931, 1932 are respectively implemented at least in media 1937, 1938 of a bus or otherwise effectively in isolation from one another. In some embodiments, a bus may be a system of two or more signal paths—not unified by a nominally ideal conduction path between them-configured to transfer data between or among internal or external computer components. For example, one data channel may include a power line (e.g., as medium 1965) operable for transmitting content of the device-detectable implementation as described herein between two taps or other terminals (e.g., as media 1963, 1967 comprising a source and destination). In another such configuration, one or more media 1937 of channel 1931 may bear portion 1997 before, while or after one or more other media 1938 of parallel channel 1932 bear portion 1998. In some embodiments, such a process may occur "while" another process occurs if they coincide or otherwise overlap in time substantially (by several clock cycles, for example). In some embodiments, such a process may occur "after" an event if any instance of the process begins after any instance of the event concludes, irrespective of other instances overlapping or the like.

In a variant in which a channel through medium 1950 bears an expression 1955 partially implementing an operational flow described herein, the remainder of the implementation may be borne (earlier or later, in some instances) by the same medium 1950 or by one or more other portions of media 1990 as shown. In some embodiments, moreover, one or more controls 1905 may configure at least some media 1990 by triggering transmissions as described above or transmissions of one or more outputs 1916 thereof.

In some embodiments, the one or more "physical media" may include one or more instances of conduits, layers, networks, static storage compositions, or other homogenous or polymorphic structures or compositions suitable for bearing signals. In some embodiments, such a "communication channel" in physical media may include a signal path between two transceivers or the like. A "remainder" of the media may include other signal paths intersecting the communication channel or other media as described herein. In some variants, another exemplary system comprises one or more physical media 1990 constructed and arranged to receive a special-purpose sequence 1982 of two or more device-detectable instructions 1984 for implementing a flow as described herein or to receive an output of executing such instructions. Physical media 1990 may (optionally) be configured by writer 1901, transmitter 1812, or the like.

In some embodiments, such a "special-purpose" instruction sequence may include any ordered set of two or more instructions directly or indirectly operable for causing multi-purpose hardware or software to perform one or more methods or functions described herein: source code, macro code, controller or other machine code, or the like. In some embodiments, an implementation may include one or more instances of special-purpose sequences 1982 of instructions 1984, patches or other implementation updates 1988, configurations 1994, special-purpose circuit designs 1993, or the like. Such "designs," for example, may include one or more instances of a mask set definition, a connectivity layout of one or more gates or other logic elements, an application-specific integrated circuit (ASIC), a multivariate transfer function, or the like.

Segments of such implementations or their outputs may (optionally) be manifested one or more information-bearing static attributes comprising the device-detectable implementation. Such attributes may, in some embodiments, comprise a concentration or other layout attribute of magnetic or charge-bearing elements, visible or other optical elements, or other particles in or on a liquid crystal display or other solid-containing medium. Solid state data storage modules or other such static media may further comprise one or more instances of laser markings, barcodes, human-readable identifiers, or the like, such as to indicate one or more attributes of the device-detectable implementation. Alternatively or additionally such solid state or other solid-containing media may include one or more instances of semiconductor devices or other circuitry, magnetic or optical digital storage disks, dynamic or flash random access memories (RAMs), or the like. Magnetoresistive RAMs may bear larger implementation or output portions or aggregations safely and efficiently, moreover, and without any need for motors or the like for positioning the storage medium.

Segments of such implementations or their outputs may likewise be manifested in electromagnetic signals 1986, laser or other optical signals 1991, electrical signals 1992, or the like. In some embodiments, for example, such electrical or electromagnetic signals may include one or more instances of static or variable voltage levels or other analog values, radio frequency transmissions or the like. In some embodiments, the above-mentioned "optical" signals may likewise include one or more instances of time- or position-dependent, device-detectable variations in hue, intensity, or the like. Alternatively or additionally, portions of such implementations or their outputs may manifest as one or more instances of magnetic, magneto-optic, electrostatic, or other physical configurations 1928 of nonvolatile storage media 1926 or as external implementation access services 1972.

In some embodiments, physical media can be configured by being "operated to bear" or "operated upon to bear" a signal. For example, they may include physical media that generate, transmit, conduct, receive, or otherwise convey or store a device-detectable implementation or output as described herein. Such conveyance or storing of a device-detectable implementation or output may be carried out in a distributed fashion at various times or locations, or such conveyance or storing of a device-detectable implementation or output may be done at one location or time. As discussed above, such physical media "operated to bear" or "operated upon to bear" may include physical media that are atypically constituted or adapted to facilitate methods or functions as described herein.

In some configurations, one or more output devices 1804 may present one or more results of signaling a decision of which supplemental content to use in supplementing the one or more positions in the playable message in response to interface(s) 1810 receiving one or more invocations or outputs of an implementation of this function via linkage 1805. Such an "invocation" may, in some embodiments, comprise one or more instances of requests, hardware or software activations, user actions, or other determinants as described herein. In contexts like these, processor 1885 or other components of network 1880 may likewise constitute a secondary implementation having access to a primary instance of interface 1810 implementing methods like flow 200 as described herein.

Serial media 1960 comprises a communication channel of two or more media configured to bear a transition or other output increment successively. In some embodiments, for example, serial media 1960 may include a communication line or wireless medium (e.g., as medium 1965) between two signal-bearing conduits (e.g., terminals or antennas as media 1963, 1967). Alternatively or additionally, one or more lenses 1809 or other light-transmissive media may comprise a serial medium between a light-transmissive medium and a sensor or other light receiver 1819 or transmitter 1812. In some embodiments, such "light-transmissive" media may (optionally) comprise metamaterials or other media operable for bearing one or more instances of microwave signals, radio-wave signals, visible light signals, or the like.

In some embodiments, such a lens may be an optical element that causes light to converge or diverge along one or more signal paths. Such a light-transmissive medium may include a signal-bearing conduit, glass, or other physical medium through which an optical signal may travel. More generally, a signal-bearing conduit may be an electrical wire, a telecommunications cable, a fiber-optic cable, or a mechanical coupling or other path for the conveyance of analog or digital signals.

Alternatively or additionally, system 1900 may likewise include one or more instances of media for handling implementations or their outputs: satellite dishes or other reflectors 1817, antennas 1818 or other transducers 1975, arrays of two or more such devices configured to detect or redirect one or more incoming signals, caching elements or other data-holding elements (e.g., disks 1944, memories 1946, or other media 1990), integrated circuits 1808, or the like. In some variants, one or more media may be "configured" to bear a device-detectable implementation as described herein by being constituted or otherwise specially adapted for that type of implementation at one or more respective times, overlapping or otherwise. Such "signal-bearing" media may include those configured to bear one or more such signals at various times as well as those currently bearing them.

In some embodiments, such caching elements may comprise a circuit or device configured to store data that duplicates original values stored elsewhere or computed earlier in time. For example, a caching element may be a temporary storage area where frequently-accessed data may be held for rapid access by a computing system. A caching element likewise may be machine-readable memory (including computer-readable media such as random access memory or data disks). In some embodiments, such caching elements may likewise comprise a latching circuit or device configured to store data that has been modified from original values associated with the data (held elsewhere or computed earlier in time, for example).

In one variant, respective portions 1995, 1996 of an expression 1999 of implementation 1907 may be sent through respective channels at various times. Invoker 1912 may request or otherwise attempt to activate a computer program or streaming media overseas via a telephone cable or other channel 1931. Meanwhile, output 1916 may attempt to trigger a session or other partial implementation 1952, success in which may be indicated by receiving expression 1955 into a visual display or other medium 1950. Such a program or other implementation may be made complete, for example, once both of these attempts succeed.

In some embodiments, transducer(s) 1975 may comprise one or more devices that convert a signal from one form to another form. For example, a transducer may be a cathode ray tube that transforms electrical signals into visual signals. Another example of a transducer comprises a microelectromechanical systems ("MEMS") device, which may be configured to convert mechanical signals into electrical signals (or vice versa).

Operation 2031 describes obtaining the indication after an entirety of the message portion apparently arrives at the first device and at the second device (e.g. receiver 1573 receiving a confirmatory message or other signal 1571 from a sending system 720 indicating that one or more portions of message 795 were addressed and transmitted to two or more of systems 740-770, and were thus apparently transmitted concurrently). This may occur, for example, in a context in which message 795 comprises e-mail, a transaction record, or other text-containing content, optionally reciting a distribution list or one or more other destinations 796 explicitly. Alternatively or additionally, port 1576 may perform operation 2031 by detecting one or more acknowledgments or other indications 1574 of when one or more such systems 740, 750 actually received such a portion. In some embodiments, for example, such an indication 1574 may explicitly recite a transmission time 1577 or may implicitly indicate a transmission time (e.g. by collection module 1570 operating in a mode 1578 in which the transmission time 1577 is inferred to be within about an hour before the receipt of indication 1574 is detected). In some variants, for example, collection module 1570 may be configured to perform operation 2031 by requesting a status of message portion 1093 at system 740 via port 1576 in response to an indication of when system 740 received the portion.

Operation 2034 describes obtaining an indication of when the first device apparently received the message portion (e.g. control logic 1620 invoking module 1623 for extracting or otherwise obtaining an approximate or nominal date or time indication 1628 expressing when a transmission of image data portion 1092 to system 720 was apparently completed). This may occur, for example, in a context in which a source system 780 or intermediary (bearer) of portion 1092 records or otherwise directly expresses such an event time indication. Alternatively or additionally, sensor logic 1626 may infer such information indirectly, such as by detecting when system 720 apparently stopped requesting portion 1092 or started requesting content 1095 instead, in contexts in which such requests are repeated.

Operation 2035 describes obtaining a configuration value relating to the second device (e.g. configuration module 1590 implementing or receiving one or more values 1592-1593 of a profile 1581 characterizing one or more systems 750-770). This may occur, for example, in a context in which one or more such values 1592 are received directly from a user or default configuration in system 760 or hub 790. Alternatively or additionally, one or more such values 1593 may be received from the "second" device directly or via an intermediary. In some embodiments, such values may help to determine whether or when system 760 may (or may not) have received portions 1091, 1093. See, e.g., the configurations explained herein in conjunction with flow 400 and variants thereof.

Operation 2037 describes presenting at least some of the message portion at a user interface comprising either the first device or the second device (e.g. control logic 1620 invoking module 1622 for causing one or more speakers or other output devices 1638, 810 to present at least some of one or more portions 1617, 1618 of message 1615). This may occur, for example, in a context in which the "first" or "second" device merely comprises an output device or other component of interface module 1640, a wearable item 510, or other apparatus operable for relaying information to one or more users. Alternatively or additionally, one or more such devices may comprise storage or network components such as those of system 700.

Operation 2082 describes contacting the second device in response to an indication of the first device receiving the message portion from a third device (e.g. processor 1562 invoking module 1524 for notifying system 760 that system 770 has received at least message portion 1551). This may occur, for example, in a context in which system 720 receives at least that portion 1551 in an overlapping time interval 1541 and/or provides it to one or more other systems. Alternatively or additionally, module 1524 may likewise be invoked for signaling the decision 1527 to one or more other systems.

In light of teachings herein, numerous existing techniques may be applied for notifying or otherwise communicating with wireless or other networked equipment, for example, for responding to interactions among other devices as described herein without undue experimentation. See, e.g., U.S. Pat. No. 7,216,144 ("Facilitating negotiations between users of a computer network through messaging communications enabling user interaction"); U.S. Pat. No. 7,133,687 ("Delivery of voice data from multimedia messaging service messages"); U.S. Pat. No. 7,095,833 ("System and method for generating call records based on account codes"); U.S. Pat. No. 7,036,128 ("Using a community of distributed electronic agents to support a highly mobile, ambient computing environment"); U.S. Pat. No. 7,010,508 ("Automated multimedia data processing network"); U.S. Pat. No. 6,868,544 ("Method and system for general-purpose interactive notifications"); U.S. Pat. No. 6,728,352 ("Switch interaction subsystems for facilitating network information management"); and U.S. Pat. No. 6,457,011 ("Method of updating a shared database in a computer network").

Operation 2083 describes notifying at least the first device of the message portion being received at the second device (e.g. processor 1562 invoking module 1525 for notifying system 770 at least that one or more other systems have apparently received message portion 1551). This may occur, for example, in a context in which system 1500 comprises an intermediary or one of the "second" systems. Alternatively or additionally, module 1521 may perform operation 2083 by notifying system 760 that it is currently receiving message portion 1552 in a context in which system 1500 transmits such content.

Operation 2088 describes establishing a signal path between the first device and the second device in facilitating the signal transfer (e.g. processor 1672 invoking module 1685 for establishing a dedicated channel 1655 or some other operable linkage 1650 facilitating communication between respective recipient devices). This may occur, for example, in a context in which system 1600 automatically becomes a host or similar coordinating entity creating or arbitrating the linkage(s), optionally with other systems. Alternatively or additionally, module 1686 may perform operation 2088 by sending one or more data objects 1692 from system 1600 to one or more other systems. In some embodiments, such data objects 1692 may effectively establish one or more such paths, for example, by determining a mode of return communication.

Operation 2089 describes causing the signal transfer in response to a user authorization (e.g. processor 1672 invoking module 1682 for contacting user 701 in response to input 708 from user 701 manifesting an apparent desire to signal one or more other users). This may occur, for example, in a context in which user 701 explicitly speaks or otherwise signals a greeting in response to an interface prompt or other output 707 accessible to user 701). Alternatively or additionally, module 1684 may perform operation 2089 automatically pursuant to a prior authorization from user 701 to invite any proximate recipients into a virtual chatroom or otherwise initiate such contact.

Operation 2132 describes obtaining the indication apparently before the first device receives any of the message portion and before the second device receives an entirety of the message portion (e.g. module 1613 detecting that at least some systems 760, 770 have apparently not yet received one or more message portions 1093, 1094). This may occur, for example, in a context in which a source or intermediary system has indicated that a broadcast in progress has not yet reached message portion 1094. Alternatively or additionally, a hub 790 or other intermediary may facilitate operation 2132 by indicating, for example, that hub 790 is presently receiving a portion 1093 of which one or more other potential destination systems 770 have not received any. In some embodiments, such a situation may facilitate more efficient routing, for example, if hub 790 is much closer to any such destination systems 760, 770 than system 710 or some other source.

Operation 2133 describes obtaining an indication that the first device and the second device have each apparently received at least some of a common broadcast (e.g. module 1774 receiving information 1783 from hub 790 or other systems 740-760 that system 780 has transmitted at least some common content to at least two systems 740-750). This may occur, for example, in a context in which hub 790 or router 1798 routes at least some of message 795 or other content 1775, 1095 or otherwise serves as a relay station or other service provider. Alternatively or additionally, module 1773 may perform operation 2133 by detecting one or more indirect indications 1784 of such a transmission before or after the fact. In some embodiments, for example, such indirect indications 1784 may comprise one or more instances of billing records for such content 1775; message headers, source-indicative watermarks, or similar data 1785 embedded in such content 1775; a subsequent presence of such content 1095 at one or more of the systems 740-750; a distribution list indicating such destinations for such content; or the like.

Operation 2138 describes obtaining an indication of the message portion being retrieved from storage as the indication of the first device receiving the message portion (e.g. module 1772 generating such an indication 1782 pursuant to requesting or retrieving at least content 1795 from remote or local storage 1794). This may occur, for example, in a context in which the "first" device comprises playback module 1792 or other devices in network 1790 able to access such storage 1794. Alternatively or additionally, module 1771 may likewise accept such a retrieval event as an indication 1781 of whether or when the "second" or other devices received message portion 1091. In some embodiments, one or more instances of comparators or other such evaluation logic 178N may then be used for comparing such indications 1781 with one or more minimum or maximum thresholds 1715-1717 effectively implementing the time interval of the "second" device's reception. In some variants, for example, such a time interval implementation may only signify an effective beginning, for example, in a case in which the time interval extends to the moment of comparison. Conversely, a time interval implementation may be implemented in other cases merely by applying one or more thresholds 1716 (with any offsets or other modifiers 1718, for example) that effectively determine the interval's end.

Operation 2181 describes causing a module to decide whether to enable the signal transfer partly in response to one or more apparent user preferences and partly in response to the indication of the first device receiving the message portion during the time interval (e.g. processor 1672 invoking module 1681 for enabling module 1683 only if user 701 expresses a preference to interact with other recipients and if timing logic 1695 indicates that port 1651 and one or more other recipients' systems 730-740 have apparently received one or more common message portions 1616, 1617 alternatingly or otherwise during respective overlapping time intervals 1696-1698). This may occur, for example, in embodiments in which primary module 1680 performs operation 480. It may occur more frequently, moreover, in a context in which at least one such portion 1616 has a nominal playback time of longer than an hour, in which a large community of users requests such a portion 1617 on an ongoing basis, in which such time intervals are defined to be longer than an hour, or in other such circumstances as described herein. Alternatively or additionally, module 1683 may trigger the signal transfer(s) immediately, after a fixed delay, or after one or more additional criteria are satisfied. In some embodiments, for example, such criteria may include a determination whether one or more portions 1616, 1617 have already been replayed at another specific recipient's system, whether the specific recipient has not been blocked or otherwise negatively reviewed, and/or whether such a message replay has apparently been observed, or in other such logical combinations with other circumstances described herein.

In light of teachings herein, numerous existing techniques may be applied for detecting selection events or other direct or indirect indicia of users' needs or preferences as described herein without undue experimentation, in light of teachings herein. See, e.g., U.S. Pat. No. 7,242,413 ("Methods, systems and computer program products for controlling tree diagram graphical user interfaces and/or for partially collapsing tree diagrams"); U.S. Pat. No. 7,231,443 ("System allowing user associating user off-line status messages of selectable content with participants on user's authorized access lists"); U.S. Pat. No. 7,222,782 ("Cash dispensing automated banking machine with improved user observation capabilities"); U.S. Pat. No. 7,200,640 ("Continuously tunable, graphic internet navigation tool"); U.S. Pat. No. 7,194,689 ("Generic user control point tool for universal plug and play (UPnP) devices"); U.S. Pat. No. 7,142,205 ("Single gesture map navigation graphical user interface for a personal digital assistant"); U.S. Pat. No. 7,120,615 ("Neural network system and method for controlling information output based on user feedback"); U.S. Pat. No. 7,120,234 ("Integrated tone-based and voice-based telephone user interface"); U.S. Pat. No. 6,757,902 ("Computer system for automatically instantiating tasks designated by a user"); U.S. Pat. No. 6,714,840 ("User-machine interface system for enhanced interaction"); U.S. Pat. No. 6,317,116 ("Graphical click surfaces for force feedback applications to provide selection of functions using cursor interaction with a trigger position of a graphical object").

In light of teachings herein, numerous existing techniques may be applied for invoking decision circuitry or the like in response to various combinations of event timing and user actions as described herein without undue experimentation. See, e.g., U.S. Pat. No. 7,069,507 ("Event routing model for an extensible editor"); U.S. Pat. No. 7,031,998 ("Systems and methods for automatically managing workflow based on optimization of job step scheduling"); U.S. Pat. No. 6,993,681 ("Remote administration in a distributed system"); U.S. Pat. No. 6,933,685 ("Method and apparatus for controlling lighting based on user behavior"); U.S. Pat. No. 6,622,137 ("System and method for business decision implementation in a billing environment using decision operation trees"); and U.S. Pat. No. 6,484,261 ("Graphical network security policy management").

Operation 2185 describes signaling the decision whether to facilitate the signal transfer responsive to an indication of when the second device received the message portion (e.g. module 1721 responding in a manner contingent on whether the "second" device is apparently behind the "first" device, in its respective progress through one or more message portions 1091-1094). This may occur, for example, in a context in which system 740 will pause or slow down in response to an indication that system 710 apparently began receiving portion 1094 after system 740 did. Conversely, system 740 may undergo operation 2185 by jumping forward or speeding up its playback in response to an indication that system 760 is apparently somewhat more advanced in its playback progress. Alternatively or additionally, such adjustments may be performed automatically or only after notifying or requesting authorization therefor from respective recipients. Alternatively or additionally, module 1723 may be invoked for notifying one or more such recipients of one or more somewhat contemporaneous delivery or playback events of one or more common message portions 151K, optionally including one or more quantitative expressions 1731 of differences in progress. In some embodiments, for example, such expressions 1731 may take the form of a number or graphical size, optionally expressed in a common image 1730 with one or more other expressions 1732 of an apparently preferred language, an affiliation, a geographical location, a user identifier, or some other information relating to such other recipient(s).

Operation 2186 describes manifesting the signal transfer as a first signal to the first device responsive to receiving a second signal from the second device (e.g. processor 1562 invoking module 1526 for transmitting an invitation or other "first" signal 1571 to system 760 directly or indirectly in response to a request, notice, or other "second" signal 1572 from system 750). This may occur, for example, in a context in which hub 790 or system 710 implements system 1500, in which collection module 1570 performs operation 430, and in which at least processor 1562 and primary module 1520 jointly perform operation 480.

Operation 2187 describes facilitating at least a partial synchronization between the first device and the second device (e.g. processor 1562 invoking module 1522 for delaying a presentation in a "leading" system 740, conditionally or otherwise). This may occur, for example, in a context in which a user or administrator thereof has expressed a preference for such synchronization, in which such synchronizations occur system-wide as a matter of course, in which such replay never proceeds in the absence of such synchronization, or in other such circumstances or combinations of circumstances. Alternatively or additionally, processor 1562 may likewise invoke module 1523 for performing operation 2187 by facilitating an acceleration of a presentation in a "trailing" system 750, conditionally or otherwise. In some embodiments, for example, such accelerations may be implemented by a "gentle" replay speed adjustment (of about 10% or less) and/or by closing the gap by foregoing some detour or otherwise jumping ahead (closer to a "leading" system's current replay position, for example).

Operation 2211 describes causing one or more sensors to detect at least the environmental-regularity-indicative data from the environment (e.g. processor 1162 invoking module 1181 for actuating one or more instances of sensor module 549 to capture at least some ERI data 561 from environment 505). This may occur, for example, in a context in which system 710 implements system 1100 within system 500 or logic 547, including at least such an instance of processor 1162 and module 1181. Alternatively or additionally, one or more input devices 820 may be configured to perform operation 2211, such as by activating one or more sensors in environment 805 in response to user 801 beginning an activity.

In light of teachings herein, numerous existing techniques may be applied for configuring, triggering, or otherwise causing sensors to detect data indicative of cheating or other events in a user's environment as described herein without undue experimentation. See, e.g., U.S. Pat. No. 7,237,717 ("Secure system for electronic voting"); U.S. Pat. No. 7,051,206 ("Self-authentication of value documents using digital signatures"); U.S. Pat. No. 6,999,714 ("Test administration system using the internet"); U.S. Pat. No. 6,976,269 ("Internet co-location facility security system"); U.S. Pat. No. 6,961,482 ("System for archiving electronic images of test question responses"); U.S. Pat. No. 6,615,020 ("Computer-based instructional system with student verification feature"); U.S. Pat. No. 6,381,444 ("Interactive multimedia virtual classes requiring small online network bandwidth"); and U.S. Pat. No. 5,915,973 ("System for administration of remotely-proctored, secure examinations and methods therefore").

Operation 2213 describes configuring the environmental-regularity-indicative data to include at least an indication of a user wearing one or more sensors (e.g. logic 547 or system 500 invoking module 1182 for detecting whether or when user 501 is wearing an earpiece, badge, sensor module 549, antenna, wristband, or similar item incorporating a sensor of some kind). This may occur, for example, in a context in which sensor module 549 is configured to detect one or more of a living person's body temperature, a device-detectable human heartbeat, a pressure or conductivity indication, or some similar indication that an item is in proximity to a person. Such sensor modules may incorporate a variety of existing sensors operable, for example, for detecting one or more of pressure, temperature, force, deflection, proximity, or similar physical conditions. Alternatively or additionally, a microphone, camera, or other sensor 806 may perform operation 2213 by capturing a visual, audible, or other indication that such a sensor is being worn (in item 1066, for example), with or without such a sensor being activated. In some embodiments, for example, a similar wearable item may be used for sensing whether a person who is detained in a workplace or home is still within a facility as required.

Operation 2217 describes accepting an image that includes more than one kilobyte of image data from an eye of a user (e.g. extraction logic 745 invoking module 742 for generating a large-enough image by keeping one or more ocular portions 1011, 1012 of image data 1080). This may occur, for example, in a context in which such data constitutes some or all of the environmental-regularity-indicative data, and in which such an invocation causes the accepted image data to be locally accessible (e.g., located in memory 1173 or storage 1174, in some embodiments). In some contexts, alternatively or additionally, extraction logic 745 may invoke module 744 for performing operation 2217 by extracting a one megabyte or larger image portion (portion 974 in grayscale or color format, for example, extracted from frontal image 973). Alternatively or additionally, two or more frames each having less than one kilobyte of ocular data may be aggregated with a sampling period of about one second or less. Although such data may currently be computationally intensive to combine effectively into higher-resolution images on a large scale, archiving such data for potential future use may permit current irregularities to be detected in the future, and may thus also provide effective current deterrence.

Operation 2218 describes accepting environmental-regularity-indicative data distilled so that at least 2% of image data thereof consists of ocular data (e.g. extraction logic 745 invoking module 741 for receiving such content). This may be accomplished by cropping, for example, even in a context in which a smaller fraction of pre-distillation image data is ocular data, whether or not any image recognition logic is used for verifying the content of any image data. In some variants, alternatively or additionally, receiver 1140 may perform operation 2218 by accepting such distilled environmental-regularity-indicative data from a camera or other remote source. Logic 547 may likewise perform operation 2218 internally by distilling raw image data from sensor module 549 such as by data compression or similar techniques for discarding redundant or other unwanted components. Such embodiments may be particularly useful, for example, in contexts in which linkage 555 is bandwidth-limited or in which some other resource capacity in item 510 is running low. In some variants, sensor module 549 may be configured to include a camera positioned within about 5 centimeters of a user's eye, and positioned so that image data of a higher ocular content (10% or more, for example) may be achieved with little or no processing. In some embodiments, fractions of data described herein may be expressed in terms of ratios of bits. Any such thresholds may likewise be applied to pixel counts or other areal units, however, within the scope and spirit of these teachings.

Operation 2252 describes configuring the distillation recording of the environmental-regularity-indicative data to include at least data arising from a first sensor distinct from data arising from a second sensor (e.g. processor 1162 invoking module 1133 for converting raw data 1143 from a sensor into distilled data 1141 and module 1135 for converting raw data 1145 from one or more other sensors into distilled data 1147). This may occur, for example, in a context in which processor 1162 invokes module 1138 for invoking two or more other modules 1131-1139 (in alternation, in succession, in parallel, or otherwise). Alternatively or additionally, extractor 571 may be configured to perform operation 2252 by invoking module 566 for including at least some of each such raw data 1143, 1145 in environmental-regularity-indicative data 561. This may occur, for example, in a context in which extractor 571 may receive data from more than one sensor implemented in sensor module 549 or in which extractor 571 implements at least some of primary module 1130 as shown in FIG. 11.

Operation 2254 describes causing some of the environmental-regularity-indicative data from a testing session to be preserved responsive to a correct portion of the user-response-indicative data from the testing session (e.g. processor 1162 invoking module 1132 for preserving data 1112-1115 arising shortly before, after, or among one or more automatically-graded exam answers 1123-1124 determined by module 1136 to be correct). This may occur, for example, in a context in which a large amount of raw ERI data 1110 is initially aggregated with answers or other URI data 1120, and in which a selection of which segments of ERI data to preserve depends partly or wholly on which roughly-contemporaneous segments of URI data were more than 70% correct. Alternatively or additionally, module 1132 may be configured to discard more than 90% of raw ERI data 1110 in response to module 1134 determining that a user has failed an exam or exam section by a margin of more than 5%.

Operation 2259 describes causing a remote system to preserve at least the distillation recording of the environmental-regularity-indicative data after processing a prior recording of the environmental-regularity-indicative data from the environment (e.g. processor 1162 invoking module 965 of FIG. 9 or module 1687 of FIG. 16 remotely for storing output 1146 resulting from one or more portions of primary module 1130 processing ERI data 1110 from one or more prior sessions). This may occur, for example, irrespective of whether the invoked module(s) are implemented locally to processor 1162, near any part of primary module 1130, or elsewhere. Alternatively or additionally, logic 547 may be configured to perform operation 2259, such as by pre-processing and then transmitting the distillation to an instance of system 500 that is remote from item 510. In some embodiments, item 510 may be shipped back after a responsive interaction, for example, for uploading the distilled responses or other result to a central instance of system 500, optionally with the related ERI data or distillation.

For such applications, sensor module 549 may include a charge-coupled device (CCD), microphone, or other sensors operable for effectively extracting a user's answers as well as regularity indications. In some instances, moreover, common raw data may serve as both ERI data 561 and URI data 562. In a context in which raw data 1144 includes one-megabyte images taken each second, for example, a suitable URI distillation recording may include a final score or just a last image of each page of the user's writing. A suitable ERI distillation recording from module 1130 may include a sampling of one or more images arbitrarily selected somewhere in a testing session, with the sample times optionally unknown to the user.

Operation 2312 describes accepting a first image from a first vantage in the environment and a second image from a second vantage in the environment in the environmental-regularity-indicative data (e.g. handling logic 1170 accepting at least two segments 1071-1073 as first and second images provided from different sensors via port 1155). Such images may, for example, include one or more instances of frontal images 973; ocular portions 1011, 1012 of an image as images; over-the-shoulder images 1060; top views; or other image data 1080 such as side views (see FIG. 8) obtained from more than one vantage. Alternatively or additionally, two or more such images from different vantages may be obtained from a mobile optical sensor such as a camera phone, security camera, or the like. In some such variants, moreover, a sensor module 549 on wearable item 510 may include one or more optical sensors operable for transmitting images from various vantages.

Operation 2314 describes configuring the environmental-regularity-indicative data to include at least geographic-position-indicative data and other sensor data (e.g. extraction circuitry 745 invoking module 743 for including one or more location indices 731, 732 and other roughly contemporaneous measurement data 733 in ERI data 735 or ERI data 561). This may occur, for example, in a context in which a local global positioning device (GPS) 729, a local hub, a mobile device 728, or some other reliable device provides one or more of a city or facility name, a longitude and latitude, or similar geographical information to an instance of system 500 implementing system 700. Alternatively or additionally, ERI data 561 may be configured to include one or more instances of sensor data 734 received from wearable items 510, 1066 or from stationary microphones, cameras, or other sensors 806, 727.

Operation 2316 describes configuring the environmental-regularity-indicative data to include at least an indication of whether a user wears one or more devices (e.g. extraction logic 745 invoking at least module 965 for accepting one or more frontal or other images or auditory content 983 that may indicate a presence or absence of articles on a user's person). This may occur, for example, in a context in which access to such articles is forbidden during a session, or in which such access is restricted to certain uses. In some embodiments, for example, an examinee or other participant may be permitted to wear a calculator watch but not to use it for calculations. Alternatively or additionally, a participant upon whom faint vocal-range sounds may be heard may warrant a higher sound-sampling rate to archive such sound data, for at least some of an interactive session, optionally via a sensor of earpiece 543. (Later scrutiny of audio or image data may show that such sounds were produced by a hearing aid, for example, or by unauthorized communications with an accomplice.) In another context, image data may be used to verify whether a user's goggles or other then-required items stayed on throughout a session.

Operation 2353 describes distilling a first fraction >X of the environmental-regularity-indicative data from a first portion of an image and a second fraction <X of the environmental-regularity-indicative data from a second portion of the image for one or more values of X (e.g. processor 1162 invoking module 1139 for retaining more than 10% of ocular data and less than 5% of auditory data). This may occur, for example, in a context in which X is any value in the range of 0.05 to 0.10. Alternatively or additionally, processor 1162 may invoke module 1137 for retaining periodic samples at a higher rate for a first data feed and at a lower rate for a second data feed.

In light of teachings herein, numerous existing techniques may be applied for preferentially retaining or otherwise processing digital or other data in a manner tending to provide a useful sampling, indexing, summary, or other effectively distilled environmental indicator as described herein without undue experimentation. See, e.g., U.S. Pat. No. 7,203,620 ("Summarization of video content"); U.S. Pat. No. 7,167,853 ("Matching and compensation tests for optimizing correlated subqueries within query using automatic summary tables"); U.S. Pat. No. 6,970,462 ("Method for high speed packet classification"); U.S. Pat. No. 6,956,904 ("Summarizing videos using motion activity descriptors correlated with audio features"); U.S. Pat. No. 6,941,513 ("System and method for text structuring and text generation"); U.S. Pat. No. 6,816,884 ("System and method for creating conversationally-styled summaries from digesting email messages"); U.S. Pat. No. 6,662,180 ("Method for searching in large databases of automatically recognized text"); U.S. Pat. No. 6,571,020 ("Introducing reduced dataset information into a primary image dataset"); and U.S. Pat. No. 6,385,604 ("Relational database management system having integrated non-relational multi-dimensional data store of aggregated data elements").

Operation 2355 describes causing an association between timing data and auditory data of some of the environmental-regularity-indicative data to be preserved (e.g. processor 1162 invoking timing logic 1190 for retaining segment boundary markers or other periodic timing indicators in audio data 971). This may occur, for example, in a context in which one or more parts of primary module 1130 perform operation 650 jointly with timing logic 1190. Alternatively or additionally, such an association may be preserved by mapping answer timing data or other data from audible phenomena to a corresponding position in the audio clip. (In other embodiments, auditory samples may be taken at arbitrary intervals or other asynchronous events and preserved without any associated timing data.)

Operation 2358 describes extracting one or more non-ocular portions of image data from the environmental-regularity-indicative data from the environment (e.g. processor 1162 invoking module 1152 for systematically preserving one or more instances of non-ocular portions 1014 and/or discarding other non-ocular portion 1015 of image data 1080). This may occur, for example, in a context in which local irregularities portions in image data 1080 (indicative of writing, for example, or other questionable material 1063 in an environment) may warrant preserving higher resolution. Alternatively or additionally, processor 1162 may invoke filter module 1151 for discarding or consolidating solid portions of images (e.g. those having no intensity gradients larger than 5% per pixel).

Operation 2444 describes accepting information about the one or more positions at a message supplementation system (e.g. input processing module 1210 invoking module 1212 for establishing one or more instances of segment numbers or other position identifiers 1281, 1282 in response to input 1202 from an editor, composer, or other user). This may occur, for example, in a context in which more than one user may each provide one or more pointers or other segment access objects 1222, 1232 to supplement a respective location 1221, 1231 in the playable message(s). Alternatively or additionally, input processing module 1210 may perform operation 2444 by receiving deletion markers, content highlighting, or other information 1206 about one or more positions in message 795 (identified by one or more fields 1243, for example).

Operation 2447 describes obtaining a relationship at least between the one or more positions and one or more past event dates (e.g. database manager 1280 invoking module 1289 for configuring record 1240 to indicate one or more instances of session dates 1242 and/or positions 1243 within message 1090 or other content 1095). This may occur, for example, in a context in which some or all of record 1240 is received as or within a common message 1205. Alternatively or additionally, input processing module 1210 may perform operation 2447 by invoking module 1211 for configuring one or more fields 1241-1244 of record 1240 in response to user input 1203.

Operation 2449 describes obtaining one or more user identifiers in the indication of the playback system configuration (e.g. coordination module 1340 receiving one or more identifiers 1344 in association with one or more attributes 1381 of configuration 1321). This may occur, for example, in a context in which an implementation of such attributes requires that an identified requester be authorized and/or in which such user tracking is desirable for accountability in a multi-user environment. Alternatively or additionally, administration module 1320 may invoke module 1321 for permitting some users to perform functions including such configuration changes.

Operation 2462 describes interleaving one or more supplemental content segments between a first message portion and a second message portion of the playable message (e.g. processor 1472 invoking module 142B configured to insert one or more data segments 1073 or other items between portion 1091 and portion 1094 of message 1090). This may occur, for example, in a context in which message 1090 constitutes a very popular or otherwise excellent presentation of which a directly preceding portion 1091, a portion 1092 that may be superseded, or a succeeding portion 1094 has become outdated or otherwise problematic. In some instances, various contributors may provide a succession of competing or other respective versions of inserted segments, of proposed deletions, or even of other sequence changes. In some embodiments, a playback system configuration may specify that such situations be addressed according to one or more selectable protocols 1481, 1482. A default protocol may stop a message presentation after presenting portion 1091, for example, and offer a recipient a choice between two or more options each described by its respective option attributes. Another protocol may cause the playback system always to choose the shortest, longest, or newest of the available supplementation options, for example, avoiding the need to stop the presentation. Another protocol may cause the playback system always to choose one of the options (according to an arbitrary or preliminary protocol, for example) and simultaneously to indicate that another supplementation option is available (on a display screen, for example) for selection by a user.

Operation 2463 describes causing one or more systems to be configured using at least the playback system configuration (e.g. module 1311 configuring playback system 1370 and/or a playback module of system 750 according to profile 1333). This may occur, for example, in a context in which playback system 1370 (implemented as system 710, for example) comprises a computer, telephone, or other general-purpose device in which one or more playback features are implemented via special-purpose software. Alternatively or additionally, system 1310 may be configured to install or otherwise select one or more such features in response to a user buying a membership, a performance, a license, a subscription, or some other item featuring access to the playable message.

Operation 2467 describes receiving one or more content types of one or more supplemental content segments (e.g. database manager 1280 invoking module 1291 for accepting one or more categories 1260 in relation to at least content segment 765). This may occur, for example, in a context in which such categories 1260 identify one or more instances of lengths 1261, ratings 1262, recommends 1263, providers 1264, subjects 1265, languages 1267, levels 1268, or other type descriptors of each such supplemental content segment in its context. Alternatively or additionally, evaluation logic

1280 may be provided for evaluating size 1298 or other such information relating to some such segments. In some embodiments.

Operation 2468 describes accepting the decision from a user (e.g. processor 1472 invoking module 1446 for accepting the decision 1463 of which supplemental content 1441, 1443 to use embodied in one or more user preference expressions 1467). This may occur, for example, in a context in which system 740 implements system 1400, in which module 1446 causes one or more users to be queried in response to encountering more than one option (in selecting supplemental content 1443 or content 1441, for example) available for use at one or more positions in message 795. Alternatively or additionally, protocol implementation logic 1480 as described herein may be configured to implement such decisions more broadly, optionally circumventing any need for such user decisions in some or all subsequent circumstances.

Operation 2543 describes causing a presentation to exclude a portion of the playable message at least in response to the indication of the playback system configuration (e.g. configuration module 1270 invoking module 1274 for queuing or otherwise triggering a presentation of message 1090 at system 730 without portion 1092 in response to one or more putative attributes of system 730). This may occur in a context in which hub 790 or some other system provides such attributes, for example, at an initial configuration, at regular or arbitrary intervals, just before the presentation, while a preceding portion 1091 of message 1090 is being transmitted or presented, or at other times as described herein. Alternatively or additionally, such a playback system configuration 1277 may combine one or more group-specific attributes 1272 with at least a system-specific attribute 1271, each of which may affect a composite filter 1273 to be applied to one or more successive message portions 1094 under consideration.

Operation 2546 describes obtaining an association between the playback system configuration and one or more specific systems (e.g. administration module 1320 invoking module 1322 for implementing a selection from a set of profiles 1331-1333 adoptable by playback system 1370 or other systems having playback functionality). This may occur, for example, in a context in which one such profile 1332 is a default assigned to all systems in a group until some other profile 1331, 1333 is specified for a given system. Alternatively or additionally, module 1322 may be implemented to perform operation 2546 by assigning one or more default parameters or profiles 1333 in response to one or more attributes 139X of each playback system added to a group. In some contexts, this may enable any playback system in which a user identifies a group affiliation, for example, to play back content according to one or more attributes defined for that group.

Operation 2548 describes causing the playback system to receive at least a portion of the playable message responsive to the playback system configuration (e.g. filter 1284 invoking module 1288 for forwarding or marking portion 1093 of message 1090 for use by system 710 in response to portion 1093 passing one or more criteria 1283 used for system 710). This may occur, for example, in a context in which a content source or hub 790 includes at least an instance of filter 1284 configured to check content in this manner on behalf of system 710. Alternatively or additionally, some or all portions 1093 of another message 795 may not be routed to system 710 in response to failing the one or more criteria 1283. See operation 2543 as described above, for example. In some embodiments, such criteria may require or forbid the message to include one or more instances of markings or audience-specific subject matter, for example. Alternatively or additionally, the one or more criteria 1283 may require or otherwise favor specific formats, sizes, authorships, or other such considerations, any of which may be taken into account in light of teachings herein.

Operation 2565 describes accessing at least some information about a first content segment from a first system and some information about a second content segment from a second system (e.g. processor 1472 invoking module 1449 for configuring presentation sequence 1490 to include respective pointers 1491, 1492 to or samples 1493, 1494 from one or more segments 725 resident at system 720 and one or more segments 765 resident in system 760). This may occur, for example, in a context in which some such content need not always be retrieved upon signaling. Efficiencies may be gained in such configurations if such data retrieval may be performed in a background or batch mode, for example. Alternatively or additionally, module 1449 may perform operation 2565 by controlling the flow of selected supplemental content during the presentation(s) of the playable message(s). Alternatively or additionally, in some contexts, module 1449 may be configured to access pointers, samples, or other information relating to such segments 725, 765 (from system 720 or hub 790, for example). Such information may be useful, for example, in ranking or otherwise evaluating such segments before obtaining them as described herein.

Operation 2567 describes applying one or more content selection criteria to an inventory of available content in selecting one or more supplemental content segments (e.g. processor 1472 invoking module 1447 for selecting a message segment or other supplemental content as "acceptable" or "best" within inventory 1450 or other available inventories using one or more ranking criteria 1422 that pertain to one or more specific playback systems). This may occur, for example, in a context in which more than one item 1451, 1453 of supplemental content are related to subject matter identified within or near the one or more positions of a message 795 to be supplemented and in which the ranking criteria 1422 arise from a history 1465 of a specific user's behaviors, explicit choices 1468, and/or other manifestations 1460 of preferences as described herein. Alternatively or additionally, module 1448 may perform operation 2567 on behalf of a human or automatic content aggregator in identifying suitable content to supplement message 795. In some embodiments, for example, module 1448 may comprise a composition assistant able to search a library for content that is topically related to a message component or other content in playback automatically, which may help a recipient/composer to sift content effectively enough to identify inventory that is suitable for use as supplemental content.

Operation 2569 describes configuring one or more content selection criteria using at least some of the playback system configuration (e.g. module 1312 activating one or more content filters 1343, 1353 each specified by a respective attribute 1381, 1382 of configuration 1380). This may occur, for example, in a context in which a default or other selection was made earlier in response to respective information 1342, 1352 about such content filters. Alternatively or additionally, one or more such content filters 1353 may permit one or more instances of superseding inclusion criteria 1341 or exclusion criteria 1351 to be specified by a system administrator or other user. In some embodiments, such criteria 1341, 1351 may specify and govern which providers' content will be accepted, the size or other resource allocation associated with the supplemental content, existing permissions to use the content, or other criteria as described herein.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

Although users 191, 501, 701, 801 are shown/described herein each as a single illustrated figure, those skilled in the art will appreciate that such users may be representative of a human user, a robotic user (e.g., computational entity), and/or substantially any combination thereof (e.g., a user may be assisted by one or more robotic agents). In addition, each such user, as set forth herein, although shown as a single entity may in fact be composed of two or more entities. Those skilled in the art will appreciate that, in general, the same may be said of "sender" and/or other entity-oriented terms as such terms are used herein.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method implemented at least partially by one or more processors, comprising:
    obtaining an indication of a first device receiving a message portion during a time interval in which a second device received the message portion, the time interval at least partially determined by one or more thresholds, the one or more thresholds based on an offset, the offset includes at least a time period between the indication of the message portion being retrieved from a storage device and the indication of the first device receiving the message portion;
    signaling a decision to facilitate a signal transfer at least between the first device and the second device at least partly in response to the indication of the first device receiving the message portion during the time interval in which the second device received the message portion; and
    at least one of the obtaining or signaling at least partially implemented using one or more processing devices.

2. The method of claim 1 in which obtaining an indication of a first device receiving a message portion during a time interval in which a second device received the message portion comprises:
    obtaining the indication after an entirety of the message portion apparently arrives at the first device and at the second device.

3. The method of claim 1 in which obtaining an indication of a first device receiving a message portion during a time interval in which a second device received the message portion comprises:
    obtaining a configuration value relating to the second device.

4. The method of claim 1 in which signaling a decision to facilitate a signal transfer at least between the first device and the second device at least partly in response to the indication of the first device receiving the message portion during the time interval in which the second device received the message portion comprises:
    notifying at least the first device of the message portion being received at the second device.

5. The method of claim 1 in which signaling a decision to facilitate a signal transfer at least between the first device and the second device at least partly in response to the indication of the first device receiving the message portion during the time interval in which the second device received the message portion comprises:

causing the signal transfer in response to a user authorization.

6. The method of claim 1 in which obtaining an indication of a first device receiving a message portion during a time interval in which a second device received the message portion comprises:
   obtaining an indication that the first device and the second device have each apparently received at least some of a common broadcast.

7. The method of claim 1 in which signaling a decision to facilitate a signal transfer at least between the first device and the second device at least partly in response to the indication of the first device receiving the message portion during the time interval in which the second device received the message portion comprises:
   signaling the decision to facilitate the signal transfer responsive to an indication of when the second device received the message portion.

8. The method of claim 1, further comprising:
   facilitating the signal transfer at least between the first device and the second device base at least partially on detection of the message portion being transmitted to the first device and the second device.

9. The method of claim 1, further comprising:
   activating a direct linkage between at least the first device and at least the second device in response to the indication of the first device receiving the message portion during the time interval in which the second device received the message portion.

10. The method of claim, 1 further comprising:
    notifying the first device of the second device and notifying the second device of the first device in response to the indication of the first device receiving the message portion during the time interval in which the second device received the message portion.

11. A system at least partially implemented using hardware, comprising:
    means for obtaining an indication of a first device receiving a message portion during a time interval in which a second device received the message portion, the time interval is at least partially determined by one or more thresholds, the one or more thresholds based on an offset, the offset including at least a time period between the indication of the message portion being retrieved from a storage device and the indication of the first device receiving the message portion; and
    means for a signaling of a decision to facilitate a signal transfer at least between the first device and the second device responsive to the indication of the first device receiving the message portion during the time interval in which the second device received the message portion.

12. The system of claim 11 in which the means for obtaining an indication of a first device receiving a message portion during a time interval in which a second device received the message portion comprises:
    means for obtaining an indication of when the first device apparently received the message portion.

13. The system of claim 11 in which the means for obtaining an indication of a first device receiving a message portion during a time interval in which a second device received the message portion comprises:
    means for obtaining a configuration value relating to the second device.

14. The system of claim 11 in which the means for obtaining an indication of a first device receiving a message portion during a time interval in which a second device received the message portion comprises:
    means for presenting at least some of the message portion at a user interface comprising either the first device or the second device.

15. The system of claim 11 in which the means for signaling a decision to facilitate a signal transfer at least between the first device and the second device responsive to the indication of the first device receiving the message portion during the time interval in which the second device received the message portion comprises:
    means for contacting the second device responsive to an indication of the first device receiving the message portion from a third device.

16. The system of claim 11 in which the means for signaling a decision to facilitate a signal transfer at least between the first device and the second device responsive to the indication of the first device receiving the message portion during the time interval in which the second device received the message portion comprises:
    means for notifying at least the first device of the message portion being received at the second device.

17. The system of claim 11 in which the means for signaling a decision to facilitate a signal transfer at least between the first device and the second device responsive to the indication of the first device receiving the message portion during the time interval in which the second device received the message portion comprises:
    means for establishing a signal path between the first device and the second device in facilitating the signal transfer.

18. The system of claim 11 in which the means for signaling a decision to facilitate a signal transfer at least between the first device and the second device responsive to the indication of the first device receiving the message portion during the time interval in which the second device received the message portion comprises:
    means for causing the signal transfer responsive to a user authorization.

19. The system of claim 11 in which the means for obtaining an indication of a first device receiving a message portion during a time interval in which a second device received the message portion comprises:
    means for obtaining the indication apparently before the first device receives any of the message portion and before the second device receives an entirety of the message portion.

20. The system of claim 11 in which the means for obtaining an indication of a first device receiving a message portion during a time interval in which a second device received the message portion comprises:
    means for obtaining an indication that the first device and the second device have each apparently received at least some of a common broadcast.

21. The system of claim 11 in which the means for obtaining an indication of a first device receiving a message portion during a time interval in which a second device received the message portion comprises:
    means for obtaining an indication of the message portion being retrieved from storage as the indication of the first device receiving the message portion.

22. The system of claim 11 in which the means for signaling a decision to facilitate a signal transfer at least between the first device and the second device responsive to the indication of the first device receiving the message portion during the time interval in which the second device received the message portion comprises:
    means for causing a module to decide to enable the signal transfer responsive to one or more apparent user preferences and responsive to the indication of the first device receiving the message portion during the time interval.

23. The system of claim 11 in which the means for signaling a decision to facilitate a signal transfer at least between the first device and the second device responsive to the indication of the first device receiving the message portion during the time interval in which the second device received the message portion comprises:
 means for signaling the decision to facilitate the signal transfer responsive to an indication of when the second device received the message portion.

24. The system of claim 11 in which the means for signaling a decision to facilitate a signal transfer at least between the first device and the second device responsive to the indication of the first device receiving the message portion during the time interval in which the second device received the message portion comprises:
 means for manifesting the signal transfer as a first signal to the first device responsive to receiving a second signal from the second device.

25. The system of claim 11 in which the means for signaling a decision to facilitate a signal transfer at least between the first device and the second device responsive to the indication of the first device receiving the message portion during the time interval in which the second device received the message portion comprises:
 means for facilitating at least a partial synchronization between the first device and the second device.

26. A system comprising:
 electrical circuitry for obtaining an indication of a first device receiving a message portion during a time interval in which a second device received the message portion, the time interval at least partially determined by one or more thresholds, the one or more thresholds based on an offset, the offset including at least a time period between the indication of the message portion being retrieved from a storage device and the indication of the first device receiving the message portion; and
 electrical circuitry for a signaling of a decision to facilitate a signal transfer at least between the first device and the second device responsive to the indication of the first device receiving the message portion during the time interval in which the second device received the message portion.

27. An apparatus comprising:
 one or more non-transitory media configured to bear a device-detectable implementation of a method including at least
 obtaining an indication of a first device receiving a message portion during a time interval in which a second device received the message portion, the time interval at least partially determined by one or more thresholds, the one or more thresholds based on an offset, the offset including at least a time period between the indication of the message portion being retrieved from a storage device and the indication of the first device receiving the message portion; and
 signaling of a decision to facilitate a signal transfer at least between the first device and the second device responsive to the indication of the first device receiving the message portion during the time interval in which the second device received the message portion.

28. An apparatus comprising:
 one or more non-transitory media bearing a device-detectable output indicating an occurrence of
 obtaining an indication of a first device receiving a message portion during a time interval in which a second device received the message portion, the time interval at least partially determined by one or more thresholds, the one or more thresholds based on an offset, the offset including at least a time period between the indication of the message portion being retrieved from a storage device and the indication of the first device receiving the message portion; and
 signaling a decision to facilitate a signal transfer at least between the first device and the second device responsive to the indication of the first device receiving the message portion during the time interval in which the second device received the message portion.

\* \* \* \* \*